(12) United States Patent
Murashima et al.

(10) Patent No.: US 6,179,493 B1
(45) Date of Patent: Jan. 30, 2001

(54) CAMERA

(75) Inventors: Nobuharu Murashima, Nara; Shinichi Nishimura, Sakai, both of (JP)

(73) Assignee: Minolta Co., Ltd., Osaka (JP)

( * ) Notice: Under 35 U.S.C. 154(b), the term of this patent shall be extended for 0 days.

(21) Appl. No.: 09/393,836

(22) Filed: Sep. 10, 1999

(30) Foreign Application Priority Data

Sep. 11, 1998 (JP) .................................................. 10-258326

(51) Int. Cl.⁷ ............................ G03B 17/42; G03B 19/12
(52) U.S. Cl. .......................... 396/358; 396/402; 396/443
(58) Field of Search .............................. 396/48, 401, 402, 396/358, 443

(56) References Cited

U.S. PATENT DOCUMENTS

| | | | |
|---|---|---|---|
| 4,182,557 | * | 1/1980 | Date et al. ............................ 396/358 |
| 4,350,421 | * | 9/1982 | Ueda et al. ........................... 396/358 |
| 4,679,925 | | 7/1987 | Kawamura et al. ............... 354/173.1 |
| 5,025,276 | * | 6/1991 | Kitazawa et al. .................... 396/358 |

* cited by examiner

*Primary Examiner*—W. B. Perkey
(74) *Attorney, Agent, or Firm*—Sidley & Austin

(57) ABSTRACT

A camera has a first charge mechanism for charging a mirror, a second charge mechanism for charging an aperture diaphragm, a third charge mechanism for charging a shutter, an exposure preparation mechanism for performing an exposure preparation operation in response to a releasing operation, a selector for distinguishing between single-shot photographing and continuous photographing, a first detector for detecting completion of charging of the mirror, a second detector for detecting completion of charging of the aperture diaphragm, a third detector for detecting completion of charging of the shutter, and a controller for executing a flow of control such that, when the selector detects continuous photographing being performed and in addition the first and second detectors detect completion of charging of the mirror and the aperture diaphragm, the exposure preparation operation is started irrespective of the result of detection by the third detector.

13 Claims, 22 Drawing Sheets

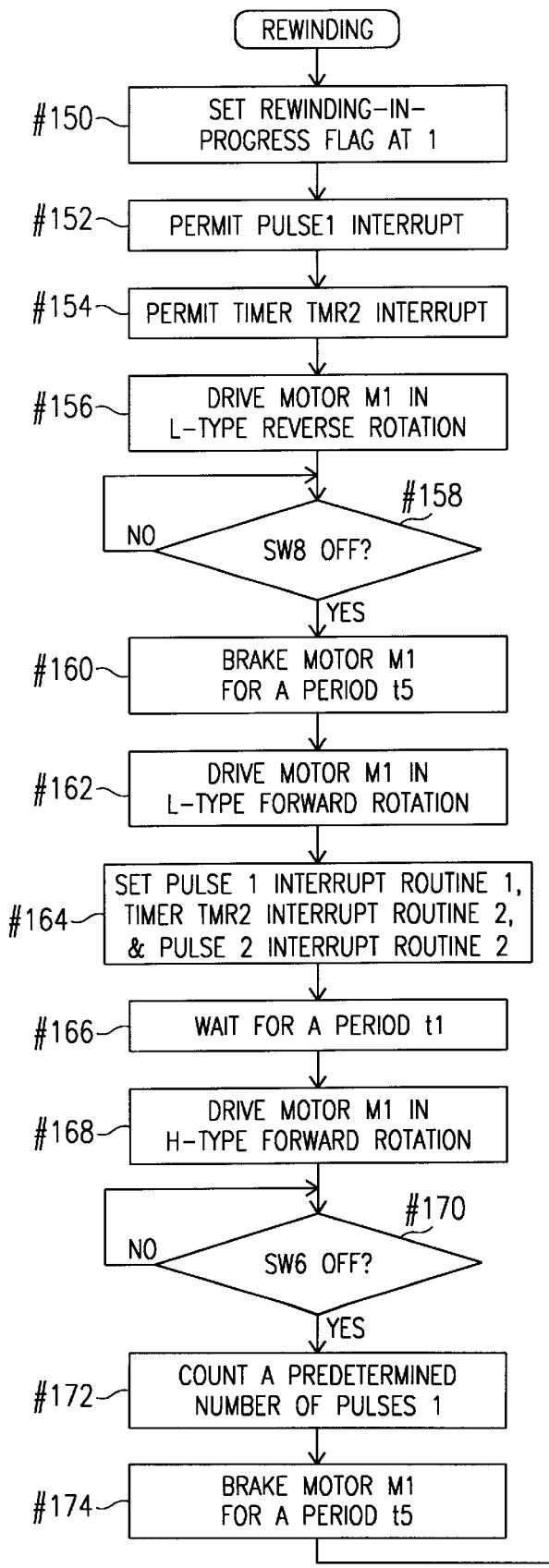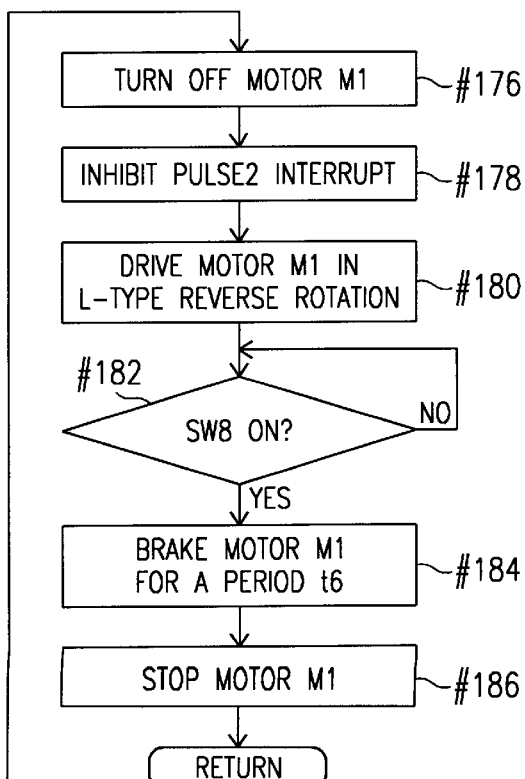
FIG. 10

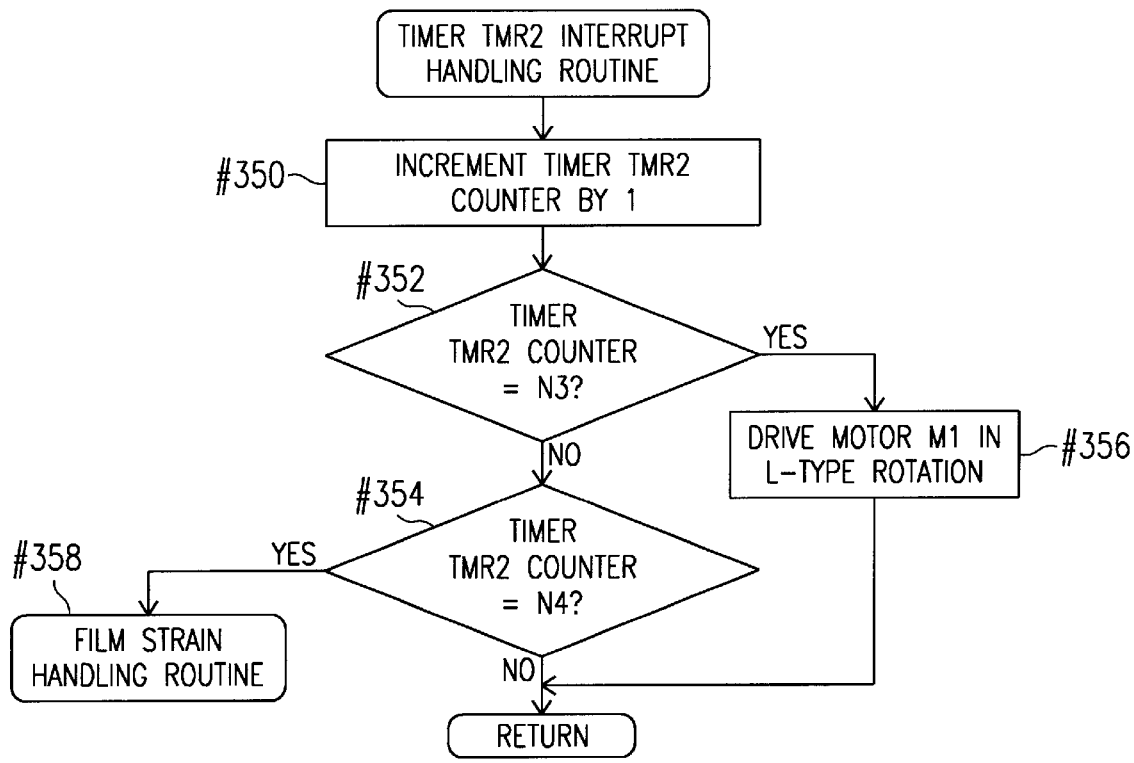
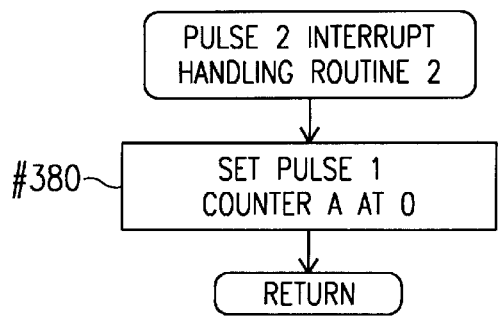

FIG. 23
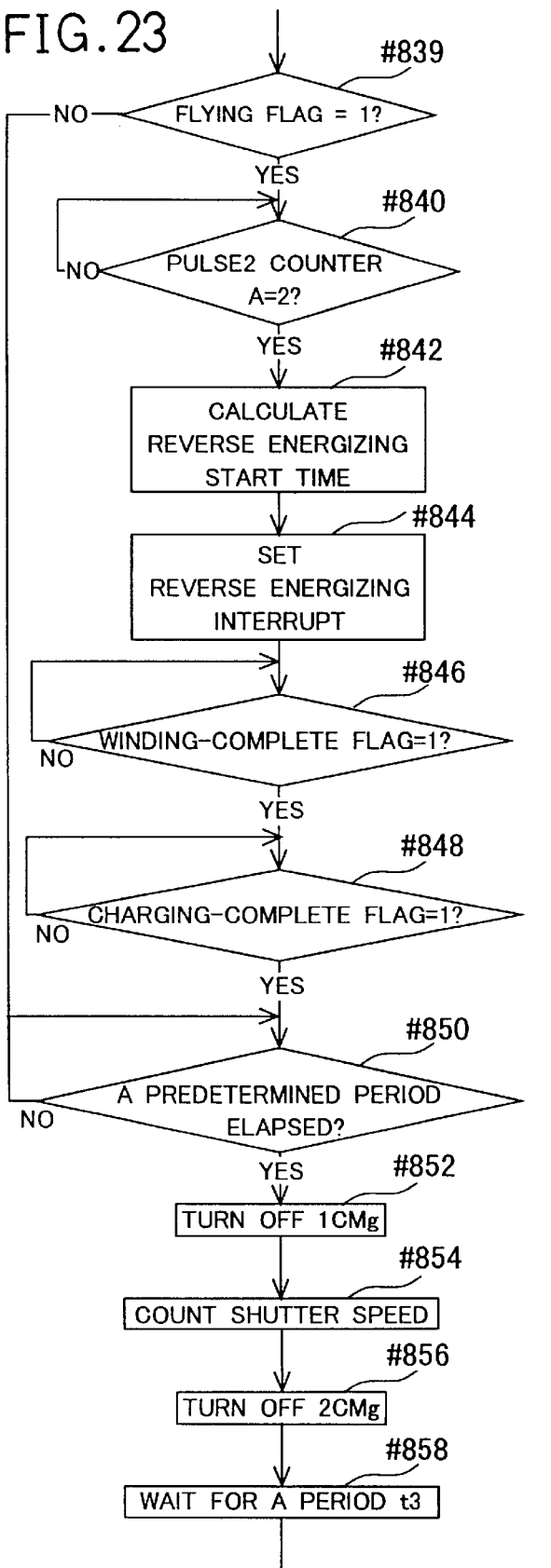
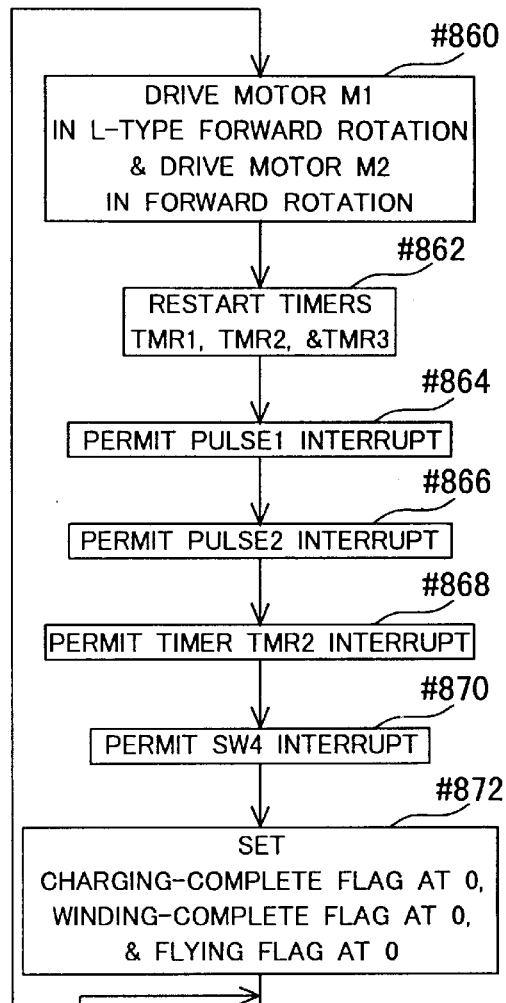

CAMERA

This application is based on application No. H10-258326 filed in Japan on Sep. 11, 1998, the entire content of which is hereby incorporated by reference.

BACKGROUND OF THE INVENTION

1. Field of the Invention

The present invention relates to a camera having a continuous photographing capability.

2. Description of the Prior Art

Conventionally, high-speed continuous photographing is achieved by speeding up the individual operations, such as charging and film feeding, performed inside a camera and thereby speeding up the operation of the camera as a whole. However, in a conventional camera design, in which a new releasing operation can be started only after completion of charging and film feeding, it is impossible to achieve an operation speed above a certain limit. For this reason, various attempts have been made to achieve a higher operation speed by improving the flow of control over an entire photographing sequence.

For example, according to U.S. Pat. No. 4,679,925, in continuous photographing, exposure preparation operations are started before completion of film feeding, provided that charging necessary to drive the mirror, the aperture diaphragm, the shutter, and the taking lens has already been completed.

However, in this arrangement, exposure preparation operations are started only after completion of all kinds of charging including those which are not necessary from the viewpoint of a photographing sequence, and this causes an unnecessary delay in starting exposure control operations.

SUMMARY OF THE INVENTION

An object of the present invention is to provide a camera capable of performing continuous photographing at higher speed.

To achieve the above object, according to one aspect of the present invention, a camera is provided with: a first charge mechanism for charging a mirror; a second charge mechanism for charging an aperture diaphragm; a third charge mechanism for charging a shutter; an exposure preparation mechanism for performing an exposure preparation operation in response to a releasing operation; a selector for distinguishing between single-shot photographing and continuous photographing; a first detector for detecting completion of charging of the mirror; a second detector for detecting completion of charging of the aperture diaphragm; a third detector for detecting completion of charging of the shutter; and a controller for executing a flow of control such that, when the selector detects continuous photographing being performed and in addition the first and second detectors detect completion of charging of the mirror and the aperture diaphragm, the exposure preparation operation is started irrespective of the result of detection by the third detector.

BRIEF DESCRIPTION OF THE DRAWINGS

This and other objects and features of the present invention will become clear from the following description, taken in conjunction with the preferred embodiments with reference to the accompanying drawings in which:

FIG. 10 is a flow chart of the rewinding routine;

FIG. 16 is a flow chart of the timer TMR2 interrupt handling routine;

FIG. 17 is a flow chart of the pulse 2 interrupt handling routine 2;

FIG. 23 is a flow chart of the SW2 interrupt handling routine;

DESCRIPTION OF THE PREFERRED EMBODIMENTS

Figure 6:
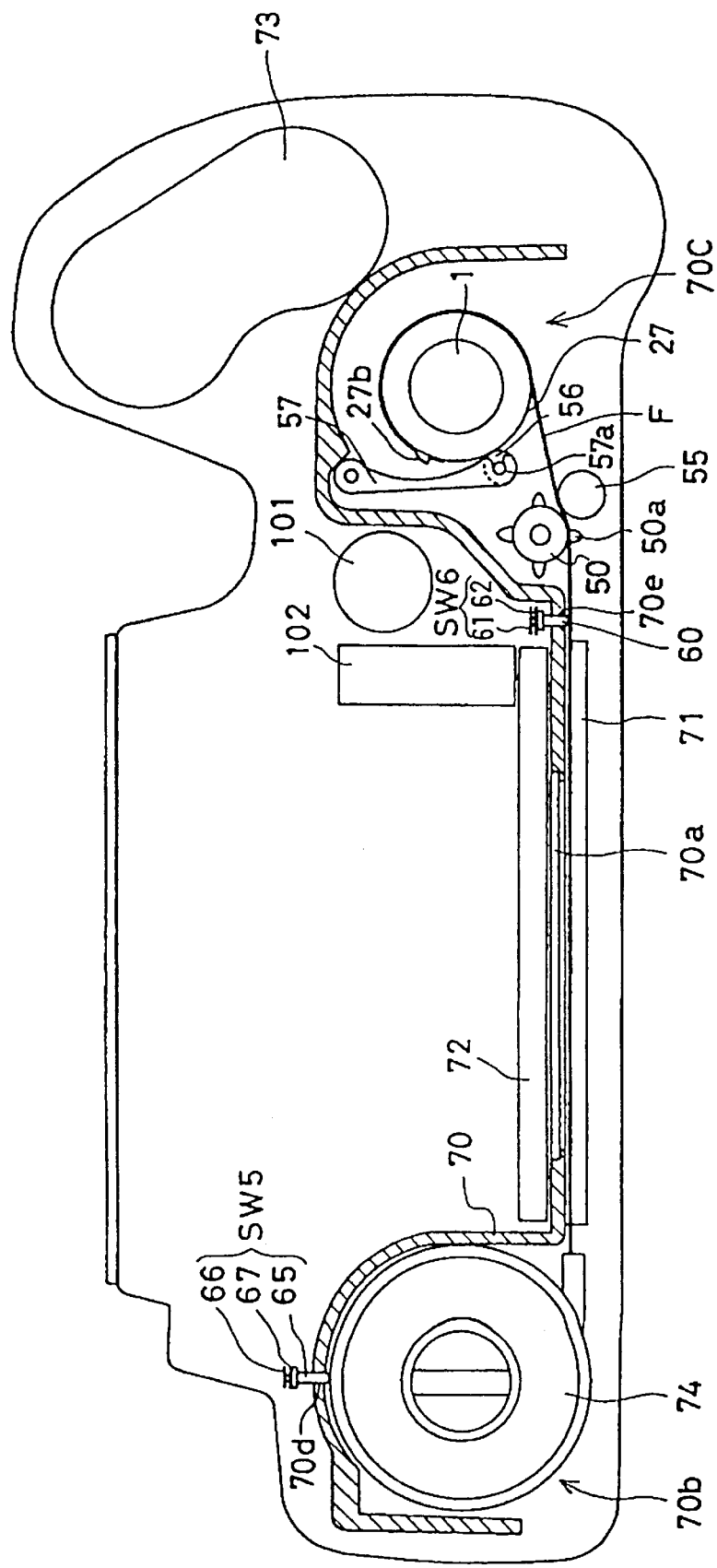
FIG. 6 is a sectional view, as seen from above, showing the outline of the structure of the entire camera of the embodiment.

Hereinafter, an embodiment of the present invention will be described with reference to the accompanying drawings. FIG. 6 is a sectional view, as seen from above, schematically showing the overall structure of an entire camera embodying the invention. In this figure, reference numeral 70 represents the body of the camera. In a lower central portion of the body 70 is formed an exposure frame 70a that indicates the photographing view field. On the left of the exposure frame 70a is formed a film cartridge chamber 70b into which a film cartridge 74 having a roll of film housed therein can be loaded. On the right of the exposure frame 70a is formed a spool chamber 70c in which a spool 27 and other components are housed.

In an appropriate position in the inner (i.e. facing the top side of the figure) side wall of the film cartridge chamber 70b is formed a small hole 70d, through which a film cartridge detecting pin 65 is placed so as to be protrusible from the wall. The film cartridge detecting pin 65 is loaded with a force that tends to press it into the film cartridge chamber 70b by a film cartridge detecting armature 67. The film cartridge detecting armature 67, together with another film cartridge detecting armature 66, constitutes a switch SW5. When the film cartridge 74 is absent, the film cartridge detecting armatures 66 and 67 are located away from each other, and thus the switch SW5 is in an off state; when the film cartridge 74 is loaded, it presses the film cartridge detecting pin 65 toward the film cartridge detecting armature 66 against the force exerted by the film cartridge detecting armature 67, until eventually the film cartridge detecting armatures 66 and 67 make contact with each other, thereby bringing the switch SW5 into an on state.

Substantially at the center of the spool chamber 70c is provided a spool 27 for winding photographic film F. The spool 27 has a claw 27b that engages with one of the perforations Fp formed in the film F to permit the film F to be easily caught around the spool 27 when it starts being wound.

Inside the spool 27 is arranged, concentrically therewith, a film winding motor 1 for driving the spool 27 in a manner as will be described later. In an appropriate position on the circumferential surface of the spool 27, preferably near the location at which the film F makes one turn around the spool 27, is arranged a film pressing roller support plate 57, which has, at its tip end 57a, a film pressing roller 56 fitted rotatably. The tip end 57a of the film pressing roller support plate 57 is loaded with a force by a spring (not shown) in such a way that the film pressing roller 56 is kept in contact with the circumferential surface of the spool 27 so as to allow the film F to be wound tight around the spool 27.

Between the exposure frame 70a and the spool 27 are arranged a sprocket 50 that is rotated by the film F being transported and a guide roller 55 that faces the sprocket 50 so as to allow the film F to be held between them as it is transported. The sprocket 50 has a toothed portion 50a that engages with the perforations Fp of the film F, and this permits the sprocket 50 to be rotated by the film F being transported. As the sprocket 50 rotates, a sprocket switch circuit board 51 shown in FIG. 2 rotates together. A pattern formed on the sprocket switch circuit board 51, together with sprocket switch armatures 52 and 53, constitutes a switch SW3. This switch SW3 is turned on and off repeatedly to output pulses while the film F is transported one frame. In this embodiment, eight pulses are generated for one frame.

Moreover, between the exposure frame 70a and the spool 27, in an appropriate position in the side wall of the body 70, is formed a small hole 70e, through which a film detecting pin 60 is placed so as to be protrusible from the wall. The film detecting pin 60 is loaded with a force that tends to press it toward the film F by a film detecting armature 62. The film detecting armature 62, together with another film detecting armature 61, constitutes a switch SW6. When the film F is not on the film detecting pin 60, or when a back lid (not shown) of the camera is open and thus the film F is not pressed onto the body 70 by a pressing plate 71 fitted on the back lid, the film detecting armatures 61 and 62 are located away from each other, and thus the switch SW6 is in an off state.

When the film F is on the film detecting pin 60 and in addition the back lid is shut with the film F pressed onto the body 70 by the pressing plate 71, the film F presses the film detecting pin 60 toward the film detecting armature 61 against the force exerted by the film detecting armature 62, until eventually the film detecting armatures 61 and 62 make contact with each other, thereby bringing the switch SW6 into an on state.

Immediately in front of the exposure frame 70a is arranged a shutter 72 having two shutter blades, called the first and second blades respectively. Reference numeral 101 represents a charge motor for actuating the shutter 72, an aperture diaphragm (not shown), and a mirror mechanism (not shown) and also for restoring (i.e. charging) them to their initial position. Reference numeral 102 represents a charge mechanism driven by the charge motor 101. Reference numeral 73 represents a battery serving as a power source for supplying electric power to whichever portion of the camera requires it.

Figure 3:
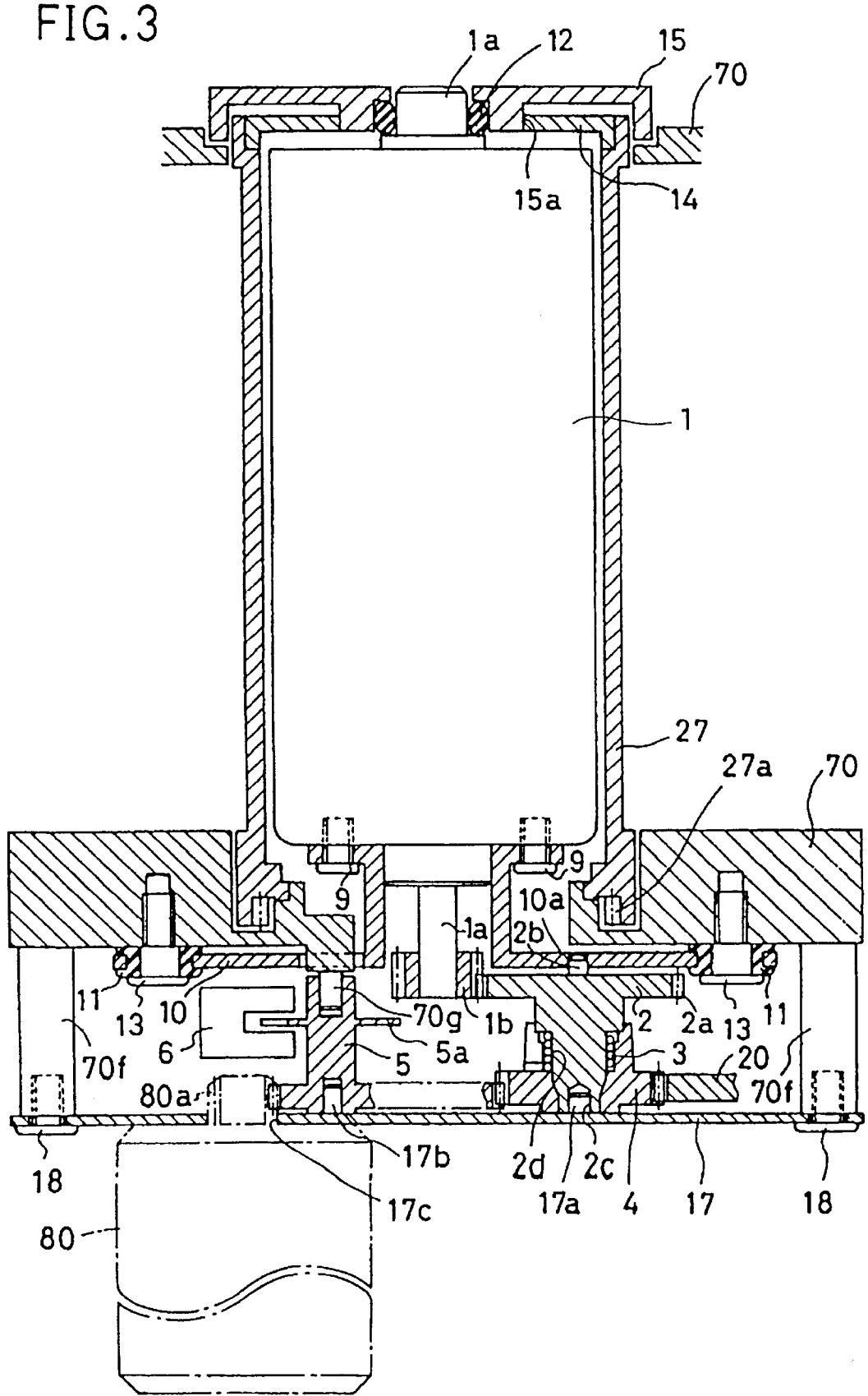
FIG. 3 is a sectional view of a portion around the film driving motor of the camera of the embodiment.

In FIG. 3, a winding tool 80, indicated by dash-and-dot lines, permits checking of the action of the film winding mechanism without energizing the film winding motor 1. The winding tool 80 has a gear 80a fitted at its tip end. In an appropriate position in a winding base plate 17 is formed a hole 17c, into which the gear 80a of the winding tool 80 fitted.

When the gear 80a of the winding tool 80 is fitted into the hole 17c, the gear 80a meshes with an encoder gear 5. In this state, by rotating the winding tool 80, it is possible to adjust or inspect the action of the film winding mechanism, or check how it works, without actually driving the film winding motor 1. In addition, this permits operation from the outside, and thus helps save cost and space.

Figure 2:
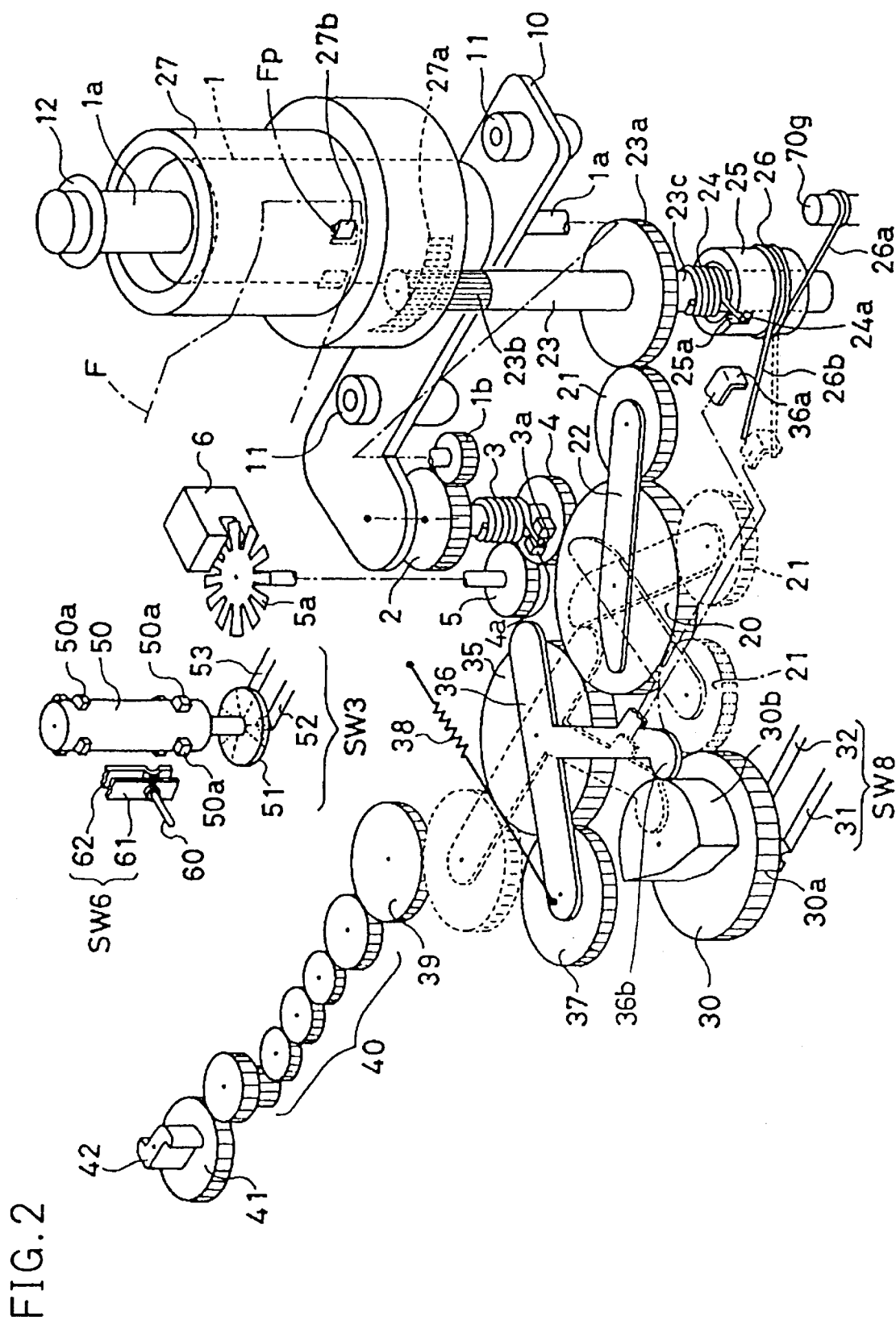
FIG. 2 is a perspective view of the film winding mechanism of the camera of the embodiment.
Figure 4A:
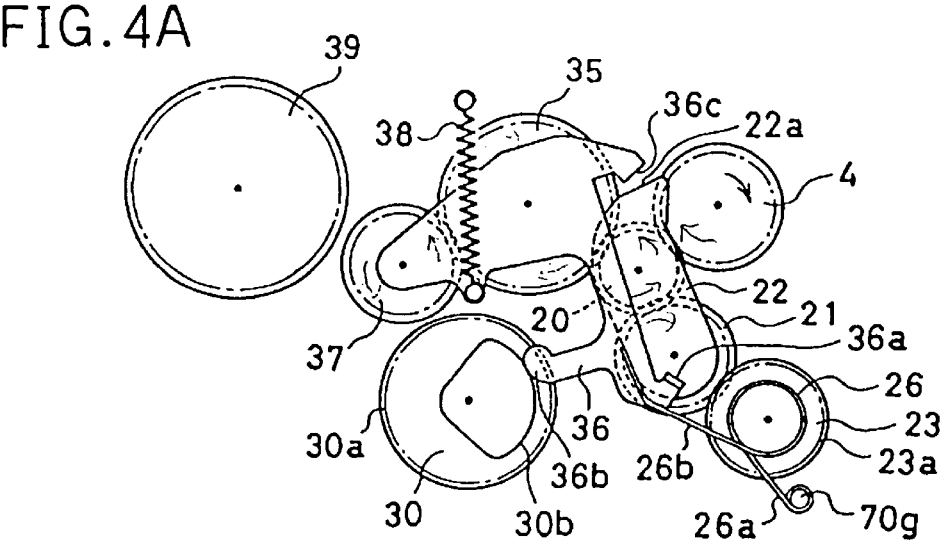
FIGS. 4A, 4B, and 4C are plan views illustrating the action, for film winding, film rewinding, and switching between them, respectively, of the drive force transmitting mechanism of the camera of the embodiment.
Figure 4B:
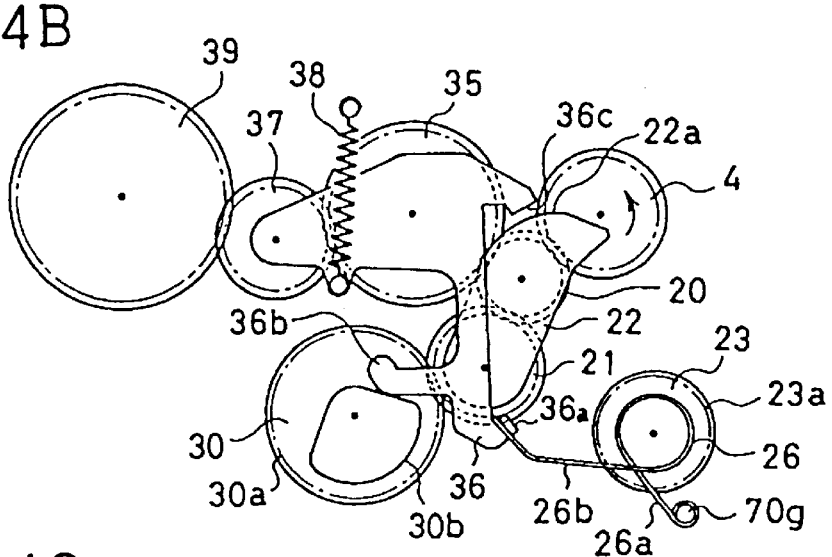
Figure 4C:
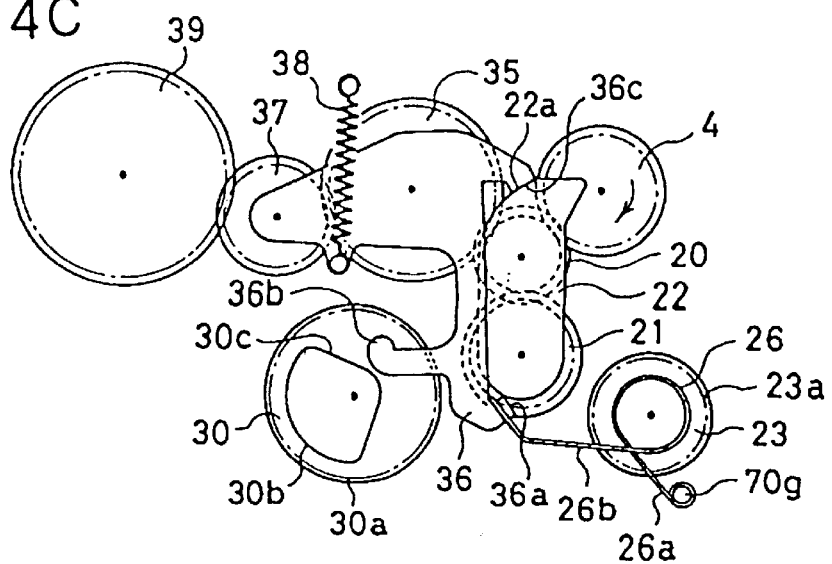

Next, the film winding mechanism will be described with reference to FIGS. 2 and 3. FIG. 2 is a perspective view of the film winding mechanism of the camera of the embodiment, and FIG. 3 is a sectional view of a portion around the film driving motor of the camera of the embodiment. FIGS. 4A, 4B, and 4C are diagrams illustrating the action, for winding, rewinding, and switching, respectively, of the drive force transmitting mechanism of the camera of the embodiment.

As shown in detail in FIGS. 2 and 3, the film winding motor 1 is arranged inside the spool 27, and is, at its bottom, fixed to a support base 10 with motor fitting screws 9 and 9. The motor support base 10 is coupled to and thereby fixed to the body 70 by being fitted around support base fitting screws 13 and 13 having elastic members 11 and 11 provided around them. These elastic members 11 and 11 allow the motor support base 10 to move slightly in both vertical and horizontal directions, and thereby help minimize the vibration that is transmitted to the body 70 as the film winding motor 1 rotates.

Moreover, between an upper portion of the motor shaft 1a of the film winding motor 1 and a spool support base 15 fixed to the body 70 is provided an elastic member 12. This elastic member 12 restricts the movement of the upper portion of the film winding motor 1, and also minimizes the vibration that is transmitted to the spool support base 15 and to the body 70 as the film winding motor 1 rotates. The spool support base 15 has a rotation support portion 15a for rotatably supporting a spool rest 14 that rotates together with the spool 27.

On the other hand, on a lower portion of the motor shaft 1a of the film winding motor 1 is provided a gear 1b that rotates together with the motor shaft 1a. This gear 1b meshes with a toothed portion 2a of a reduction gear 2. The reduction gear 2 has, at its top, an upper projection 2b that is fitted into a hole 10a formed in the motor support base 10, and has, at its bottom, a hole 2c into which a pin 17a swaged into the winding base plate 17 is fitted.

In appropriate positions on the body 70 are provided bosses 70f and 70f, and the winding base plate 17 is fixed to the tip ends of those bosses 70f and 70f with winding base plate fitting screws 18 and 18 that are screwed into the bosses 70f and 70f. The pin 17a is loosely fitted into the hole 2c formed at the bottom of the reduction gear 2. As described previously, whereas the motor support base 10 can move slightly in both vertical and horizontal directions, the winding base plate 17 is fixed to the body 70. Thus, when the motor support base 10 moves in a horizontal direction, the reduction gear 2 is inclined slightly. However, in the structure described above, a slight inclination of the reduction gear 2 does not affect the rotation of the reduction gear 2.

Moreover, the toothed portion 2a of the reduction gear 2 and the upper projection 2b thereof are relatively close to each other, and therefore, even if the motor support base 10 moves in a horizontal direction, the gear 1b of the film winding motor 1 and the toothed portion 2a of the reduction gear 2 are kept in a properly meshed state so as not to disengage from each other. In this way, a simple vibration-proof structure is adopted that does not require varying the center-to-center distance between the gear 1b and the reduction gear 2. This helps enhance durability, reduce wear and noise between gears, and suppress vibration effectively.

Around a central shaft 2d of the reduction gear 2 is provided a torsion coil spring 3, and thus the rotation of the reduction gear 2 is transmitted through this torsion coil spring 3 to a reduction gear 4. The bottom end 3a of the torsion coil spring 3 is held between stoppers 4a provided on the top surface of the reduction gear 4. When the rotation of the reduction gear 2 is transmitted to the reduction gear 4, the reduction gear 4 transmits its rotation to the encoder gear 5 and to a gear 20. If, while the reduction gear 2 is rotating clockwise, an unduly large load as resulting from the film F being strained at its tail end or the like is applied to the reduction gear 4, slipping occurs between the torsion coil spring 3 and the reduction gear 4 so that no rotation will be transmitted.

The encoder gear 5 is rotatably supported by a boss 70g provided on the body 70 and a shaft 17b swaged into the winding base plate 17, and has a pulse plate 5a arranged concentrically. A photointerruptor 6 has a light emitter and a light sensor arranged a predetermined distance apart from each other, with the pulse plate 5a placed therebetween. As the pulse plate 5a rotates, the photointerruptor 6 generates pulses. These pulses are output in synchronism with the rotation of the film winding motor 1. However, when the reduction gear 4 stops rotating as a result of the film F being strained at its tail end or the like, the photointerruptor 6 stops outputting pulses.

As shown in FIG. 2, above the gear 20, a planet lever 22 is provided so as to be rotatable concentrically therewith, and the gear 20 meshes with a planet gear 21 pivoted on a tip end portion of the planet lever 22. When the gear 20 rotates counter-clockwise, the planet gear 21 meshes with a large gear portion 23a of a spool drive gear 23 (as indicated by solid lines in the figure). By contrast, when the gear 20 rotates clockwise, the planet gear 21 meshes with a gear portion 30a of a cam gear 30 (as indicated by dash-and-dot lines in the figure). The spool drive gear 23 has a small gear portion 23b, which meshes with an inner gear 27a formed integrally in the inner wall of the spool 27 so as to rotate the spool 27.

The spool drive gear 23 has its lower portion 23c placed through a cylindrical spring barrel 25. Around the lower portion 23c of the spool drive gear 23 is wound a torsion coil spring 24. The torsion coil spring 24 has an arm 24a, which is held in a notch 25a formed in the spring barrel 25, and thus the spring barrel 25 rotates concentrically together with the spool drive gear 23.

Around the spring barrel 25 is wound a torsion coil spring 26, which has one arm 26a fixed to the boss 70g provided on the body 70 and has the other arm 26b placed so as to face a bent portion 36a provided in a rewinding planet lever 36 that is rotatable concentrically with a gear 35 with which the gear 20 meshes. When the spool drive gear 23 rotates counter-clockwise, the spool 27 also rotates counter-clockwise and thereby winds the film F.

This rotation acts to tighten the torsion coil spring 24, and thus the spring barrel 25 rotates counter-clockwise together with the spool drive gear 23 and the torsion coil spring 24. On the other hand, the same rotation acts to loosen the torsion coil spring 26, and thus slipping occurs between the spring barrel 25 and the torsion coil spring 26. The slipping torque in this loosening direction is set to be smaller than the slipping torque in the tightening direction of the torsion coil spring 24, and this makes it possible to rotate the spring barrel 25 together with the spool drive gear 23.

When the planet gear 21 is not meshed with the large gear portion 23a of the spool drive gear 23, the film F wound around the spool 27 tends to become loose owing to its own resilience and thereby gives the spool 27 and the spool drive gear 23 a rotational force that tends to rotate them clockwise. This force acts to loosen the torsion coil spring 24 and tighten the torsion coil spring 26, and therefore the slipping torque in the tightening direction of the torsion coil spring 26 becomes far greater than the slipping torque in the loosening direction of the torsion coil spring 24, preventing the spring barrel 25 from rotating clockwise.

Thus, slipping occurs between the torsion coil spring 24 and the spool drive gear 23. However, the slipping torque here is set to be greater than the above-mentioned force due to the resilience of the film F that tends to rotate the spool 27 clockwise, and therefore the spool 27 is not allowed to rotate clockwise. This prevents the film F wound around the spool 27 from becoming loose owing to its own resilience. This structure helps reduce loss in the winding force, increase the winding speed, and make efficient use of the battery power. To minimize loss in the winding force, it is preferable to use a complete one-directional clutch in place of the torsion coil springs that are used in this embodiment to exploit the difference in their slipping torque.

When the other arm 26b of the torsion coil spring 26 is pressed in its loosening direction by the bent portion 36a of the planet lever 36 (as indicated by broken lines in FIG. 2), the torque that acts to tighten the torsion coil spring 26 becomes zero, and thus the spring barrel 25 is allowed to rotate clockwise together with the spool drive gear 23 and the torsion coil spring 24. In this way, during rewinding (described later) of the film F, when the spool 27 and the spool drive gear 23 are rotated clockwise by the film F being rewound, they are saved from an undue load. This structure helps reduce loss in the rewinding force, reduce rewinding time, and make efficient use of the battery power.

The gear 35 has a rewinding planet lever 36 provided so as to be rotatable concentrically therewith, and meshes with a rewinding planet gear 37 pivoted on a tip end portion of the rewinding planet lever 36. The rewinding planet lever 36 is loaded with a force that tends to rotate it clockwise by a spring 38. The force exerted by the spring 38 is set to be strong enough to press the arm 26b of the torsion coil spring 26 in its loosening direction (from the position indicated by solid lines to the position indicated by broken lines in FIG. 2).

At the bottom of the cam gear 30, a circuit board (not shown) having a predetermined pattern printed thereon is fitted so as to be rotatable together therewith. The pattern formed on this circuit board, together with cam switch armatures 31 and 32, constitutes a switch SW8. The switch SW8 is in an on state or in an off state in accordance with whether a cam portion 30b of the cam gear 30 is in the position shown in FIG. 4A or in the position shown in FIG. 4C, respectively.

FIG. 4A shows the state observed during winding of the film F, FIG. 4B shows the state observed during switching from winding to rewinding of the film F, and FIG. 4C shows the state observed during rewinding of the film F. Hereafter, the action of this mechanism will be described. The individual gears are designed to have an appropriate number of teeth so as to maintain a predetermined relationship among them that achieves the action as described below. The phase of the cam portion 30b of the cam gear 30 is set in advance in such a way that, in the state shown in FIG. 4A, the cam portion 30b lies in the position as shown in that figure.

In FIG. 4A, the reduction gear 4 rotates clockwise. The rewinding planet lever 36 has a projection 36b, which is loaded with a force that tends to rotate it clockwise by the spring 38 and is thereby kept in contact with the cam portion 30b formed integrally with the cam gear 30. Therefore, the rewinding planet lever 36 cannot rotate further clockwise, and thus the rewinding planet gear 37 is located away from a rewinding gear 39.

In this state, when the reduction gear 4 rotates clockwise, and thus the gear 20 rotates counter-clockwise, the planet lever 22 rotates counter-clockwise until the planet gear 21 meshes with the large gear portion 23a of the spool drive gear 23, and then strikes a stopper (not shown). FIG. 4A shows this state. In this state, when the reduction gear 4 is rotated clockwise so as to wind the film F, this rotation is transmitted through the gear 20 and the reduction gear 21 to the large gear portion 23a of the spool drive gear 23, causing the spool drive gear 23 to rotate counter-clockwise. As a result, the spool 27 rotates counter-clockwise and thereby winds the film F.

In FIG. 4B, the reduction gear 4 rotates counter-clockwise. In the state shown in FIG. 4A, when the reduction gear 4 rotates counter-clockwise, the planet lever 22 disengages the planet gear 21 from the large gear portion 23a of the spool drive gear 23 and rotates clockwise until it strikes a stopper (not shown) and engages the planet gear 21 with the cam gear 30. At this time, the planet gear 21 rotates counter-clockwise, and thus the cam gear 30 rotates clockwise. As a result, the cam portion 30b of the cam gear 30 rotates clockwise and thereby releases the projection 36b of the rewinding planet lever 36.

When the projection 36b is released, the rewinding planet lever 36 is rotated clockwise by the spring 38, and thus the rewinding planet gear 37 meshes with the rewinding gear 39. How the rewinding planet gear 37 meshes with the rewinding gear 39 is set by the rewinding planet lever 36 striking a stopper (not shown). As the rewinding planet lever 36 rotates clockwise, the bent portion 36a rotates the other arm 26b of the torsion coil spring 26 counter-clockwise. This allows the spool 27 to be left in a no-load state, i.e. in an idly rotating state, during rewinding (FIG. 4C). In this state, the reduction gear 4 continues rotating until the cam portion 30b of the cam gear 30 reaches the position shown in FIG. 4C.

In FIG. 4C, the reduction gear 4 rotates clockwise. In the state shown in FIG. 4B, when the reduction gear 4 starts rotating clockwise, the planet lever 22 disengages the planet gear 21 from the cam gear 30 and starts rotating counter-clockwise. However, when the gear 20 rotates counter-clockwise, while the planet lever 22 is rotating counter-clockwise, a side portion 22a thereof opposite the planet gear 21 strikes a side portion 36c of the planet lever 36 and thereby keeps the planet gear 21 and the large gear portion 23a of the spool drive gear 23 away from each other. As a result, the reduction gear 21 is left in an idly rotating state. On the other hand, the rewinding planet gear 37 is meshed with the rewinding gear 39, and thus the clockwise rotation of the reduction gear 4 is transmitted to the rewinding gear 39.

Back in FIG. 2, the rewinding gear 39 transmits its rotation through a rewinding gear train 40 to a rewinding fork gear 41. On the rewinding fork gear 41 is arranged a rewinding fork 42 that rotates together with the rewinding fork gear 41 and that engages with a key formed in the film cartridge 74 described previously. By the clockwise rotation of the rewinding fork 42, the film F is rewound into the film cartridge 74.

Next, the charge mechanism will be described with reference to FIG. 5. In this figure, reference numeral 101 represents the charge motor described previously, which rotates a charge cam 112 through a reduction gear 111. Reference numeral 117 represents a charge lever for the aperture diaphragm, the mirror, and the shutter. When charging is complete, the charge lever 117 is locked in the position (B) shown in the figure. When a releasing magnet (not shown) is activated, the charge lever 117 is unlocked and moves in the direction (A). At this time, the aperture diaphragm is stopped down, and the mirror is lifted up. The shutter 72 shown in FIG. 6 is locked by a magnet until the stopping down of the aperture diaphragm and the lifting up of the mirror are complete, and is thus allowed to start running, by de-energizing the magnet, only a predetermined period of time thereafter.

The charge cam 112 has a cam 112a that is so formed that its radius increases as it rotates. Kept in contact with this cam 112a is a tip end portion 115a of a lever 115 that is loaded with a force that tends to rotate it clockwise by a spring 116. As the charge cam 112 rotates clockwise, the lever 115 rotates counter-clockwise, and thereby the charge lever 117 is pressed in the direction (B). This causes the aperture diaphragm to be opened fully, the mirror to be brought down, and the shutter to be charged.

When the charge cam 112 makes substantially one turn, charging is complete. The charge lever 117 remains locked by the lever 115, and therefore stops when the lever 115, rotated clockwise by the spring 116, falls into that portion of the cam 112a of the charge cam 112 where its radius is smallest. The charge cam 112 has, at its bottom, a charge cam switch circuit board (not shown) fitted so as to be rotatable together with the charge cam 112. A pattern formed on the charge cam switch circuit board, together with charge cam switch armatures 113 and 114, constitutes a switch SW4.

This switch SW4 is in an on state when charging is complete. The switch SW4 is turned off immediately after the charge motor 101 is energized and charging is started, and is turned on when the charge cam 112 makes substantially one turn and charging is complete. When the switch SW4 is turned from off to on, braking is applied to the charge motor 101 by de-energizing it.

On the other hand, the pattern formed on the charge cam switch circuit board, together with charge cam switch armatures 114 and 118, constitutes a switch SW9. This switch SW9 is turned on when charging of the mirror and the aperture diaphragm is complete. A detailed description will be given later. Note that, here, the charge cam switch armature 114 is connected to ground GND. Note also that, though not shown, a switch SW1o for allowing the user to turn on and off the continuous photographing mode at hand is formed in the body of the camera.

Figure 1:
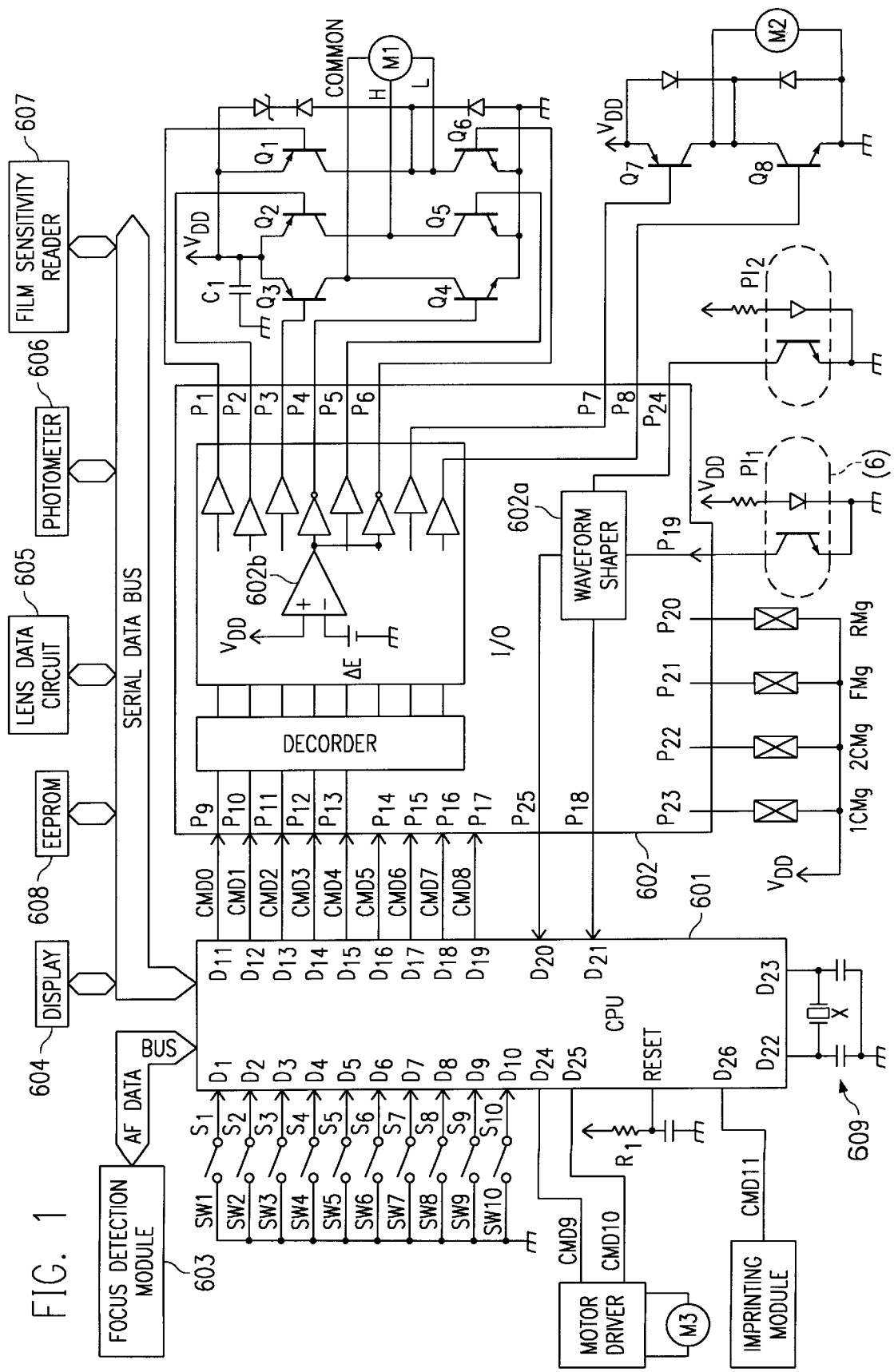
FIG. 1 is a system configuration diagram of an entire camera embodying the present invention.

FIG. 1 is a system configuration diagram of a camera embodying the present invention. Reference numeral 601 represents a camera control microcomputer (hereafter referred to as the CPU) for achieving functions such as controlling operation routines of the entire camera, controlling calculations related to exposure, and controlling calculations related to automatic focusing (abbreviated to AF). The CPU 601 is built as a system incorporating RAM (random-access memory), ROM (read-only memory), a timer, a serial I/O (input/output) handler, an A/D (analog-to-digital) converter, and I/O ports, and is provided with data buses and various I/O terminals D1 to D26 as will be described below. Reference numeral 602 represents an interface (hereafter referred to as the I/O IC) for transferring instructions from the CPU 601 to various portions of the camera and transferring signals from various portions of the camera to the CPU 601.

Reference numeral 603 represents a focus detection module for measuring the amount of defocus observed in the object image formed on the film or an equivalent plane thereof, and is composed of a one-dimensional self-scanning-type image sensor (hereafter referred to as the CCD (charge-coupled device)), a CCD driver, an A/D converter, an A/D conversion reference voltage source, and other components. The analog image data obtained from the CCD is first converted into digital signals, which are then fed by way of an AF data bus to the CPU 601.

Reference numeral 604 represents a display composed of an LCD (liquid crystal display) or LEDs (light-emitting diodes) for displaying the shutter speed Tv and the aperture value Av fed, as results of calculations to be used for AE (automatic exposure), from the CPU 601, the photographing mode, and other data. Reference numeral 605 represents a lens data circuit that is incorporated in a taking lens to store the open aperture value, the maximum aperture value, the focal length, the rotating/linear movement amount conversion coefficients necessary for focus adjustment, and other data. When the taking lens is fitted to the camera body, such data is transferred to the camera body via electric contacts provided near where they are fitted together.

Reference numeral 606 represents a photometer for measuring the brightness Bv of the object, and is composed of a light-sensing photoelectric conversion device, an A/D converter, an A/D conversion reference voltage source, a data handler for communicating data with the CPU 601, and other components. In accordance with instructions fed from the CPU 601, the photometer 606 performs photometry on the light that has passed through the taking lens. Reference numeral 607 represents a film sensitivity reader for automatically reading the sensitivity of the film loaded, and reads the film sensitivity indicated on the film cartridge, in which the film is housed, via electric contacts provided in the film cartridge chamber 70b of the camera. Reference numeral 608 represents non-volatile memory (hereafter referred to as the EEPROM (electrically-erasable programmable read-only memory)) that permits the data written thereto to be erased electrically in response to an instruction from the CPU 601.

The above-mentioned display 604, lens data circuit 605, photometer 606, film sensitivity reader 607, and non-volatile memory 608 are connected to the serial I/O handler of the CPU 601 by way of a serial data bus.

Reference symbols SW1 to SW10 represent switches. These switches are grounded at one terminal thereof and, at the other terminal thereof, connected to the input terminals D1 to D10 of the I/O ports of the CPU 601 by way of signal lines S1 to S10, respectively. When the switches SW3 and SW4 change their state from off to on, the CPU 601 detects this state change and requests an interrupt.

The I/O ports of the CPU 601 further include output terminals D11 to D13 for feeding out commands CMDO to CMD2 for controlling a film winding motor M1 (corresponding to the film winding motor 1 mentioned previously), output terminals D14 and D15 for feeding out commands CMD3 and CMD4 for controlling a charge motor M2 (corresponding to the charge motor 101 mentioned previously) for charging the aperture diaphragm locking member, the mirror, and the shutter, and output terminals D16 to D19 for feeding out commands CMD5 to CMD8 for controlling various magnets.

The CPU 601 incorporates a plurality of timers. Those timers are each composed of a counter that is incremented by an external or internal clock and a register that stores a value with which the value counted by the counter is compared constantly so that, when the count value coincides with the register value, an interrupt will be requested. In this embodiment, pulses 1 (the pulses output from the photointerruptor 6 mentioned previously) are fed to the input terminal D21 for receiving an external clock for the timers so that the pulses 1 will be counted, and, every time a pulse 1 is received, an interrupt is requested. Moreover, timers TMR1, TMR2, and TMR3 are used that count time in synchronism with an internal clock.

Reference symbol RESET represents a reset terminal that is normally kept equal to $+V_{DD}$ by a pull-up resistor R1, and, when the level at this terminal turns from a low level to a high level, the CPU 601 is reset. Reference numeral 609 represents a clock pulse generating circuit for feeding a clock signal to the CPU 601, and has a resonator X. The output terminals D24 and D25 are used to feed out commands CMD9 and CMD10 for controlling a motor driver for driving a lens drive motor M3 (not shown in pictorial drawings), and the output terminal D26 is used to feed out a command CMD11 for controlling an imprinting module for imprinting a date in response to an IP (imprint) output.

Next, the I/O IC 602 and various controllers will be described. Reference symbols 1CMg and 2CMg represent magnets for holding the first and second blades (not shown) of the shutter. When a low-level signal is fed out via the output terminal P23 or P22, the magnets 1CMg or 2CMg is energized and thereby the first or second blade is held, respectively. The period of time that passes after the first blade is released until the second blade is released corresponds to the shutter speed Tv.

Reference symbol FMg represents a magnet for locking the aperture diaphragm (not shown). When a low-level signal is fed out via the output terminal P21, the magnet FMg is energized and thereby the aperture diaphragm locking member is held; when the aperture diaphragm locking member is released, it moves back to a predetermined position where it is locked. Reference symbol RMg represents a magnet for releasing. When a low-level signal is fed out via the output terminal P20 for a predetermined period of time, a releasing member is unlocked, the aperture diaphragm is stopped down, and the mirror is lifted up so as to be retracted from the optical path.

Reference symbol PI1 represents a component that corresponds to the photointerruptor 6 described previously. This component PI1 outputs pulses, which are, as they pass through a waveform shaper 602a provided within the I/O IC 602, formed into the pulses 1, and are then output via the output terminal P18 so as to be fed to the input terminal D21 of the CPU 601. Reference symbol PI2 represents a component that outputs pulses that an encoder generates as it rotates when the aperture diaphragm (not shown) is unlocked so as to represent the degree to which the aperture diaphragm is stopped down. These pulses, similarly, are subjected to waveform shaping by the waveform shaper 602a and are then output via the output terminal P25 so as to be fed to the input terminal D20.

Reference symbols Q1 to Q6 represent transistors for driving the film winding motor M1. The film winding motor M1 has two coils of different types inside it, of which one offers a high torque at a low rotation speed (hereafter referred to as the L-type characteristics) and the other offers a low torque at a high rotation speed (hereafter referred to as the H-type characteristics). The transistors Q1 to Q6 are connected in such a way as to allow switching between the L- and H-type characteristics and switching between forward and reverse rotation for each type. The film winding motor M1 has its L terminal connected to the node between the transistors Q1 and Q6, has its H terminal connected to the node between the transistors Q2 and Q5, and has its common terminal connected to the node between the transistors Q3 and Q4. Note that the film winding motor M1 winds the film F as it rotates in the forward direction.

As shown in Table 1, the transistors Q1 to Q6 are turned on or off appropriately so as to achieve switching of the film winding motor M1 among states of resting, forward rotation (H- or L-type), reverse rotation (H- or L-type), and braking (H- or L-type). Reference symbol C1 represents a bypass capacitor that is inserted to prevent malfunctioning of the circuit by sufficiently suppressing variations that appear in the ground (GND) voltage of the motor driving devices as a result of the film winding motor M1 being turned on and off repeatedly. Note that, in this embodiment, H-type braking and H-type reverse rotation are not used.

Table 2 shows the relationship between the above-mentioned commands CMD0 to CMD2 fed from the CPU 601 to the I/O IC 602 in order to turn on or off the transistors Q1 to Q6 as shown above and the logic values fed out via the output terminals P1 to P6 of the I/O IC 602.

Reference symbols Q7 and Q8 represent transistors for driving the charge motor M2 for charging the aperture diaphragm locking member, the mirror, and the first and second blades of the shutter when they are unlocked by releasing action. As shown in Table 3, the transistors Q7 and Q8 are turned on or off appropriately by the commands CMD3 and CMD4 fed from the CPU 601 so as to achieve switching of the charge motor M2 among states of resting, forward rotation, and braking. The charge motor M2 achieves charging as it rotates in the forward direction.

Next, how the I/O IC 602 controls braking by reverse energizing will be described. First, the film winding motor M1 is made to rotate in a forward direction to wind the film F. At the reverse energizing start time described later, the film winding motor M1 is energized in the direction reverse to the direction in which it has thus far been energized so that, while the rotation rate of the film winding motor M1 is being monitored, the film winding motor M1 will be de-energized when its rotation rate drops to zero, thereby completing the winding of the film F.

Here, if the film winding motor M1 is energized suddenly in the reverse direction, the supplied voltage $+V_{DD}$ may drop abruptly, causing malfunctioning of the transistor circuit. To prevent this, the supplied voltage is monitored within the I/O IC 602 so that, when the voltage drops to such a low level that malfunctioning is likely, the film winding motor M1 will stop being energized momentarily and that, when the supplied voltage recovers its normal level, the film winding motor M1 will start being energized again. To achieve this, the I/O IC 602 incorporates a comparator 602b that receives, at one input terminal, a reference voltage and, at the other input terminal, the supplied voltage. When the supplied voltage drops below the reference voltage, the comparator 602b inverts its output level to turn off the transistors Q4 and Q6 both.

Next, how the CPU 601 controls various operation routines will be described with reference to the flow charts shown in FIGS. 7 to 20. First, the routine for film loading will be described. When the back lid of the body 70 is opened, a back lid lock switch SW7, which is interlocked with a back lid lock mechanism, is turned on. Subsequently, after a film cartridge 74 is loaded into the film cartridge chamber 70b in such a way that the perforations Fp of the leader portion of the film F housed in the film cartridge 74 reach the circumferential surface of the spool 27, when the back lid is shut, the film cartridge 74 is pressed by the back lid, and thus the switch SW5 is turned on. On the other hand, the film F is pressed by the pressing plate 71 fitted to the back lid, and thus the switch SW6 is also turned on. When the back lid is shut completely, the back lid lock switch SW7 is turned off. On detecting this, the CPU 601 starts the initial loading routine shown in FIG. 7.

In the initial loading routine, first, in step #10, the state of the switch SW5 is checked. If the switch SW5 is off, the film cartridge 74 is recognized to be absent, and thus the flow returns to the main routine without performing initial loading. If the switch SW5 is on, the flow proceeds to step #12 to check the state of the switch SW6. If the switch SW6 is off, the film F is recognized to be loaded improperly, and the flow proceeds to an initial loading failure handling routine to warn of the failure of initial loading on the display, with a buzzer, or the like.

When the back lid is shut with the film loaded properly, the flow proceeds to step #14 to set an initial-loading-in-progress flag at 1 and then to step #16 to set a pulse 1 counter A at 0 and a pulse 2 counter A at 32. This value 32 is used in initial loading to wind the film F to a position for photographing the first frame. The pulse 1 counter A is a counter for storing the number of pulses 1 generated in a period in which no pulse 2 is generated, and the pulse 2 counter A is a counter for storing the number of pulses 2 (pulses generated by the switch SW3 mentioned previously) that are generated as extra pulses until the film winding motor M1 is stopped.

Next, in step #18, the film winding motor M1 is driven in L-type forward rotation to start initial loading. At this time, the film winding motor M1 is energized in such a way that its gear 1b rotates counter-clockwise in FIG. 2. The reduction gear 2 rotates clockwise and thus causes, through the torsion coil spring 3, the reduction gear 4 to rotate clockwise. The encoder gear 5 rotates counter-clockwise, and the photointerruptor 6 outputs a pulse 1. In response to this pulse 1, in step #20, the flow is permitted to jump to the pulse 1 interrupt handling routine. On the other hand, the gear 20 rotates counter-clockwise, and the planet lever 22 rotates counter-clockwise.

The gear 35 rotates clockwise, and the rewinding planet gear 37 rotates counter-clockwise. During film winding, the cam portion 30b of the cam gear 30 is in a state as shown in FIG. 4A, and the projection 36b of the rewinding planet lever 36 is kept in contact with the cam portion 30b of the cam gear 30. This prevents the rewinding planet lever 36 from rotating clockwise, and thus the rewinding planet gear 37, unable to mesh with the rewinding gear 39, rotates idly. Accordingly, the rotation of the film winding motor M1 is not transmitted to the rewinding fork 42.

The planet lever 22 rotates counter-clockwise without its side portion 22a making contact with the side portion 36c of the rewinding planet lever 36, and, when the planet gear 21 meshes with the large gear portion 23a of the spool drive gear 23, strikes a stopper (not shown) and stops there. As a result, the spool drive gear 23 rotates counter-clockwise. Then, the small gear portion 23b of the spool drive gear 23 makes the spool 27 rotate counter-clockwise. Then, the claw 27b provided on the spool 27 engages with the perforations Fp of the film F and thereby the film F is taken out of the film cartridge 74 so as to be wound around the spool 27.

At this time, the movement of the film F causes the sprocket 50 to rotate counter-clockwise, and thus the switch SW3 outputs a pulse 2. In response to this pulse 2, the CPU 601 requests an interrupt, designating the pulse 2 interrupt handling routine as the target of the interrupt to which the flow should jump (step #22). Then, in step #24, the timer TMR2 interrupt handling routine is designated as the target of the interrupt of the timer TMR2, and the timers TMR1 and TMR2 are started (step #26). Then, the film winding motor M1 starts being driven and, a period of time t1 thereafter (step #28), the film winding motor M1 is driven in H-type forward rotation (step #30). Then, the flow waits the pulse 2 counter A to become equal to 1 (step #32).

Figure 11:
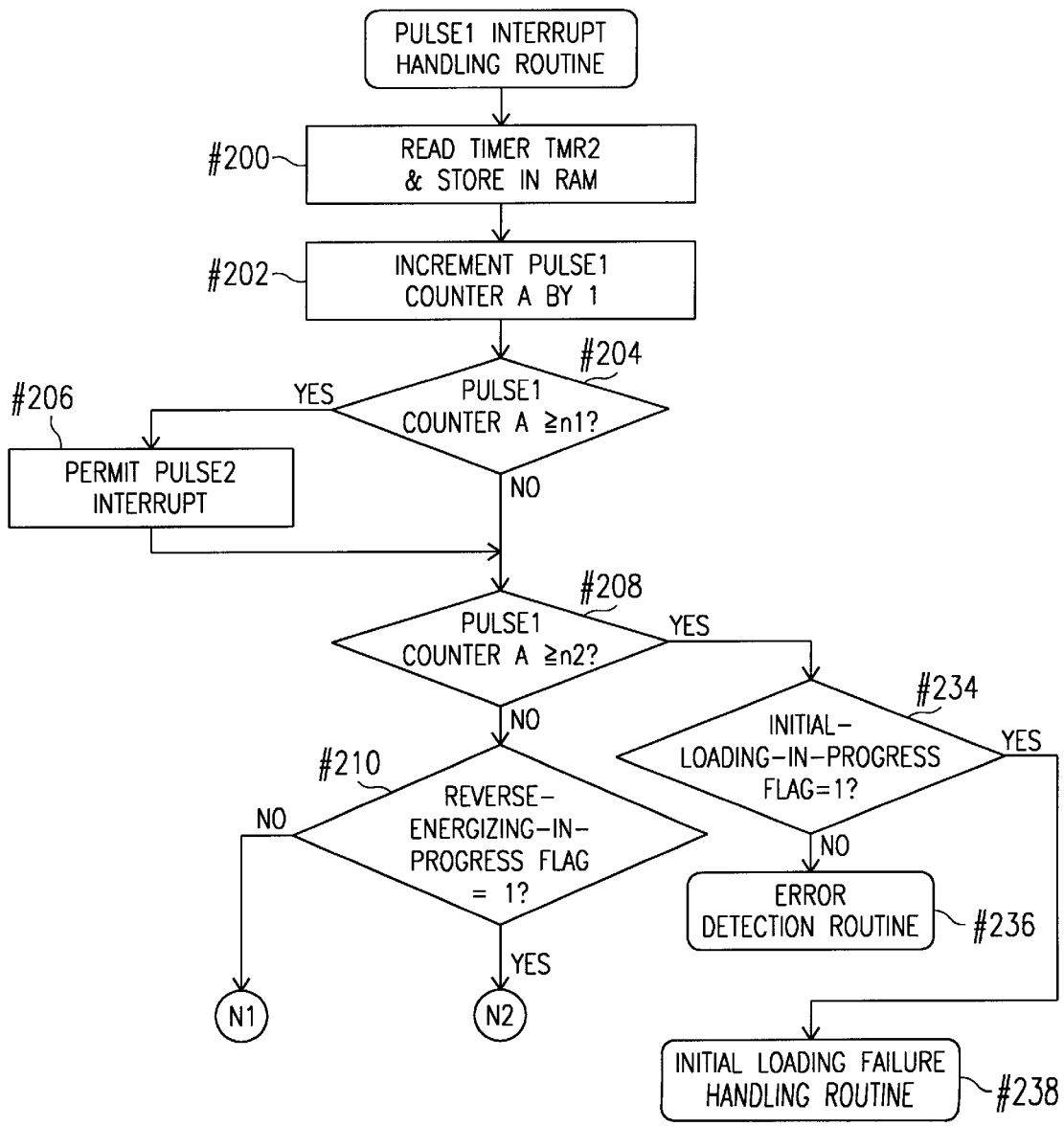
FIG. 11 is a flow chart of the first portion of the pulse 1 interrupt handling routine 1.
Figure 12:
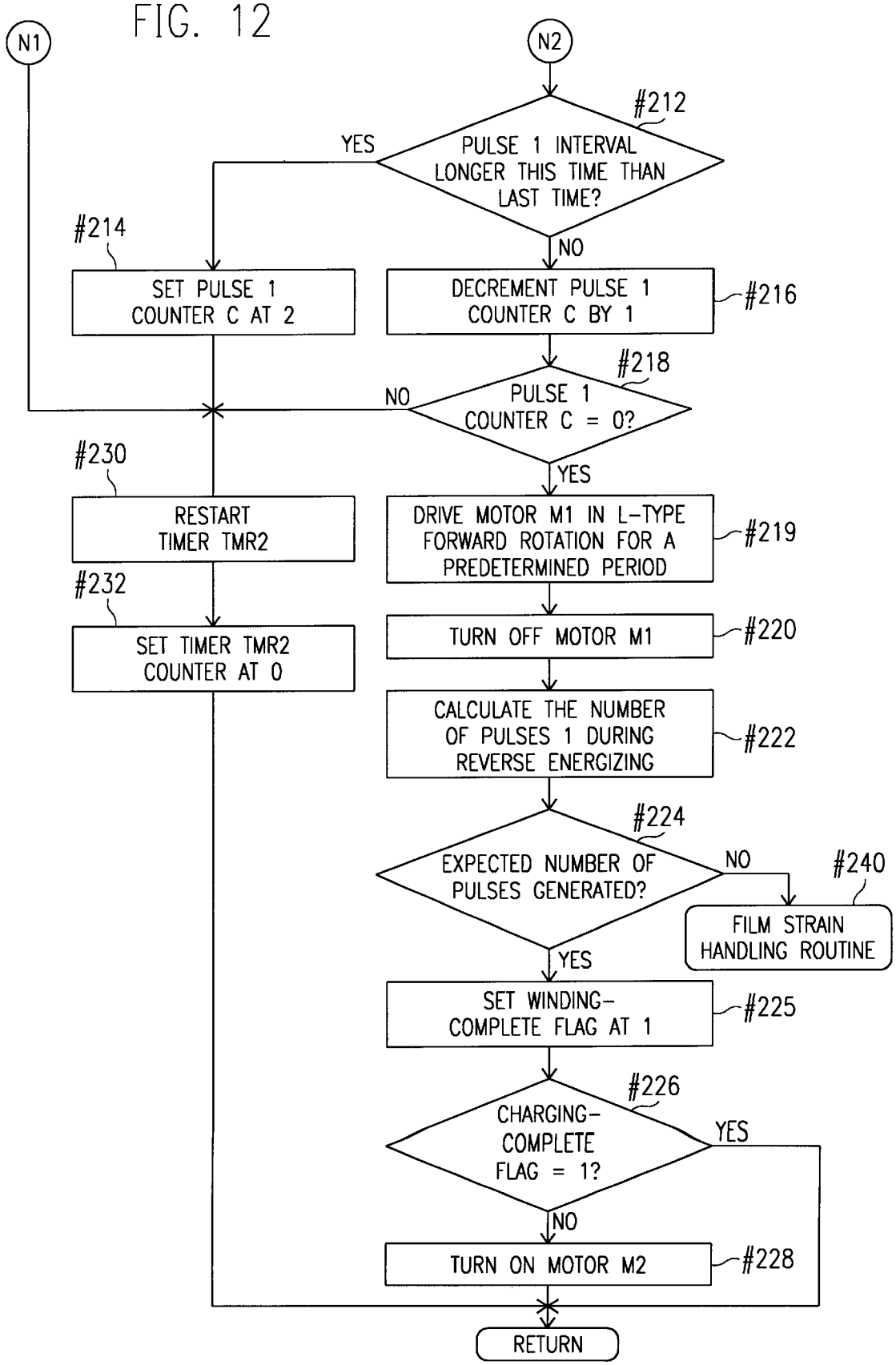
FIG. 12 is a flow chart of the second portion of the pulse 1 interrupt handling routine 1.

FIGS. 11 and 12 show the pulse 1 interrupt handling routine executed meanwhile. In FIGS. 11 and 12, first, in step #200, the count value of the timer TMR2 is read out and stored in the RAM. Next, the pulse 1 counter A is incremented by 1 (step #202), and whether or not the count value of the pulse 1 counter A is equal to or greater than N1 is checked (step #204). If the count value of the pulse 1 counter A is equal to or greater than N1, then, in step #206, a pulse 2 interrupt is permitted.

Here, it is to be noted that the switch SW3 is composed of a circuit board and sliding armatures and therefore that chattering is very likely immediately after the switch SW3 is turned on. Accordingly, if a pulse 2 interrupt is permitted immediately after completion of a pulse 1 interrupt, chattering in the pulse 2 may incur an undesired interrupt. To prevent this, it is desirable to wait for SW3 to become stable in the off state.

However, permitting an interrupt by the use of a timer as described above may cause, depending on the rotation speed of the film winding motor M1, the on period of the switch SW3 to become so long that the switch SW3 is kept on even after the end of a specified period of time. To prevent this, the number of pulses 1 that are expected to be output while the pulse 2 is on is set at N1 so that an interrupt will be permitted when a number N1 of pulses are received.

Next, in step #208, whether or not the pulse 1 counter A is equal to or greater than N2 is checked. Here, error detection as required in initial loading is performed. Specifically, if the claw 27b of the spool 27 is not engaged with the perforations Fp of the film F, or if the claw 27b of the spool 27 disengages from the perforations Fp of the film F while the film F is being wound tight around the spool 27, the spool 27 rotates idly and thus it is impossible to wind the film F. In such a condition, whereas the photointerruptor 6 outputs pulses 1, the switch SW3 outputs no pulse 2.

In step #208, whether the camera is in such a condition or not is checked. Specifically, if the count value of the pulse 1 counter A is equal to or greater than N2, whether initial loading is in progress or not is checked (step #234). If initial loading is in progress, the flow proceeds to the initial loading failure handling routine in step #238 to warn of the failure of initial loading on the display, with a buzzer, or the like. If initial loading is not in progress, the flow proceeds to an error detection routine (step #236). If the count value of the pulse 1 counter A is smaller than N2, whether reverse energizing is in progress or not is checked (step #210). If reverse energizing is not in progress, the flow proceeds to step #230 to restart (start again) the timer TMR2 and then set the timer TMR2 counter at 0, thereby ending the interrupt handling routine (step #232).

Now, how the timer TMR2 operates will be described. The timer TMR2 requests an interrupt every a predetermined period of time t2; that is, after the timer starts counting time, the flow jumps to the timer t2 interrupt handling routine shown in FIG. 16 every time a period of time t2 elapses.

In FIG. 16, first, in step #350, the count value of the timer TMR2 counter is incremented by 1. The value obtained by multiplying the count value of the timer TMR2 counter by t2 represents the period of time that has elapsed after the output of a pulse 1, and thus this period of time can be determined by checking the count value of the timer TMR2 counter (step #352). If the next pulse 1 is not generated before a period of time N3×t2 elapses, it is recognized that the film winding load is so great that the film cannot be driven by H-type driving, which offers a low torque.

Therefore, when the count value of the timer TMR2 counter reaches N3, the driving of the film winding motor M1 is switched from H-type forward driving to L-type forward driving to increase the torque of the film winding motor M1 (step #356). If, even with the increased torque of the film winding motor M1, the count value of the timer TMR2 counter reaches N4 before the next pulse 1 is generated ("yes" in step #354), it is likely that the film F is being strained at its tail end, preventing the spool 27 from rotating counter-clockwise, because, in such a case, slipping occurs between the reduction gear 2 and the torsion coil spring 3, causing the encoder gear 5 to stop rotating, and thus the photointerruptor 6 outputs no pulse 1. Accordingly, taking such a case into consideration, the flow proceeds to a film strain handling routine (step #358).

Figure 13:
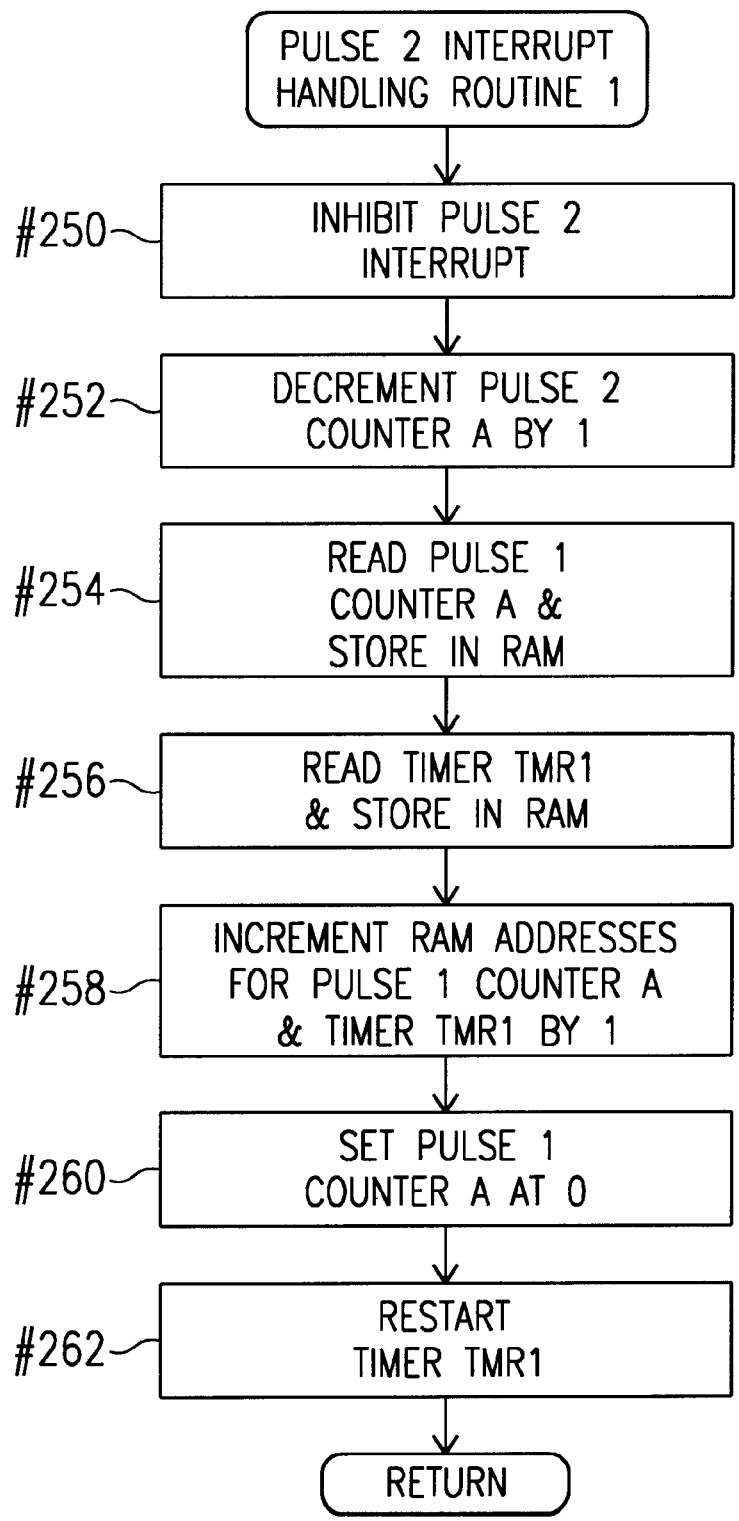
FIG. 13 is a flow chart of the pulse 2 interrupt handling routine 1.

FIG. 13 shows the pulse 2 interrupt handling routine 1. First, in step #250, a pulse 2 interrupt is inhibited, and the pulse 2 counter A is decremented by 1 (step #252). Next, the count value of the pulse 1 counter A is read out and the number of pulses 1 that have been generated after a pulse 2 was generated last time is stored in the RAM of the CPU 601; similarly, the time counted by the timer TMR1, i.e. the period of time that has elapsed after a pulse 2 was generated last time, is read out and stored in the RAM (steps #254, #256). Then, to prepare for storage of the values that will be obtained when a pulse 2 is generated next time, the addresses in the RAM at which those values will be stored are each incremented by 1 (step #258). In addition, the pulse 1 counter A is set at 0 (step #260), and the timer TMR1 is restarted (step #262). Then the flow returns to the parent routine.

During film winding, whereas the torsion coil spring 24 and the spring barrel 25 rotate together with the spool drive gear 23, slipping occurs between the torsion coil spring 26 and the spring barrel 25. As described previously, the slipping torque here is very small, and therefore the loss in the winding force can be ignored.

Figure 7:
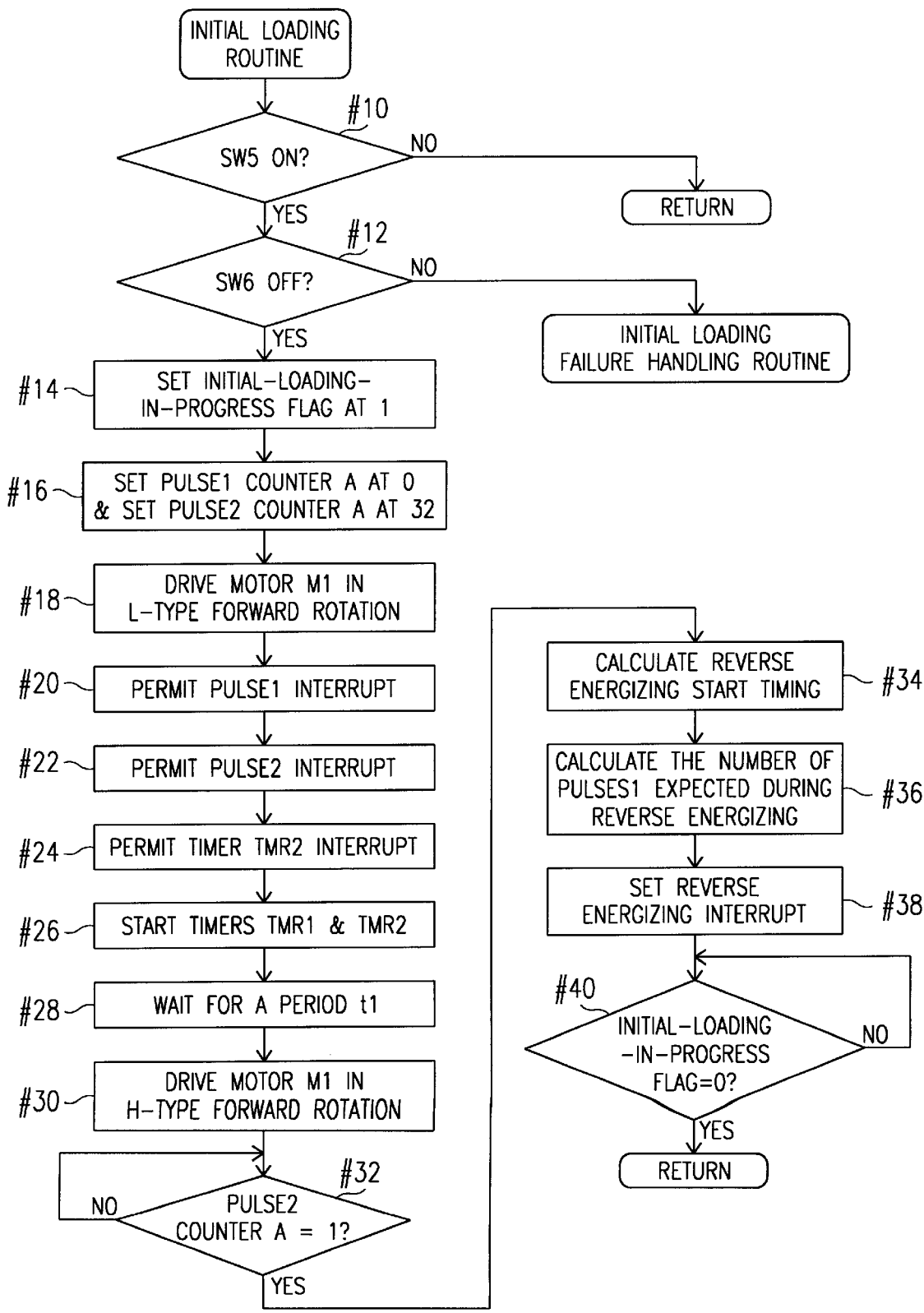
FIG. 7 is a flow chart of the initial loading routine.

Back in FIG. 7, as the winding of the film proceeds, when the count value of the pulse 2 counter A becomes equal to 1 ("yes" in step #32), the flow proceeds to step #34 to stop the film F accurately in the position for photographing the first frame. In step #34, in accordance with the values previously stored in the RAM, i.e. the number of pulses 1 generated in a period in which no pulse 2 is generated and the time interval of pulses 2, the number of pulses 1 that are generated after the count value of the pulse 2 counter A became equal to 1 until braking is applied by reverse energizing is determined by substituting appropriate values in a formula prepared in advance.

Figure 21:
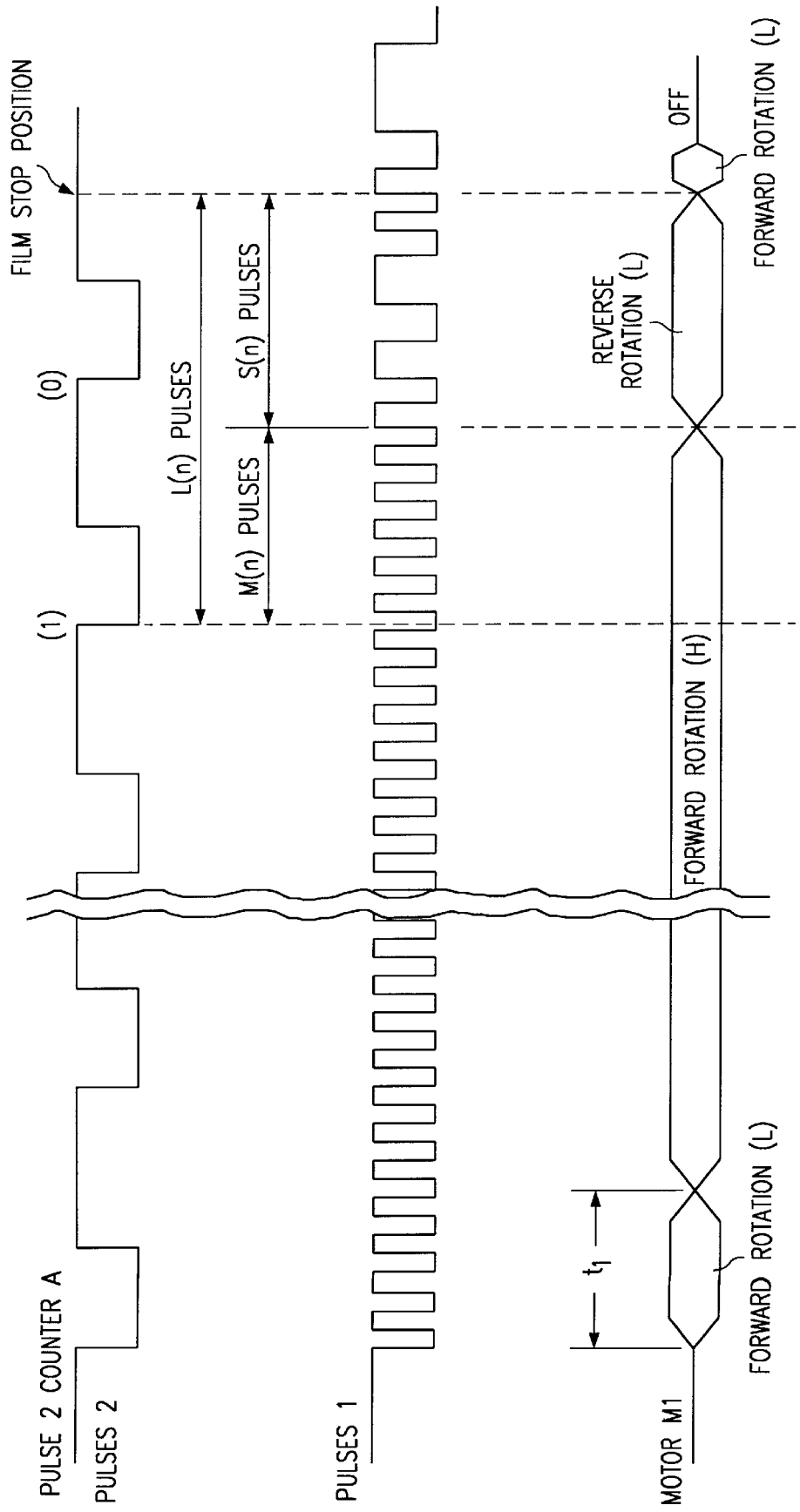
FIG. 21 is a time chart illustrating how the reverse energizing start time adjustment routine proceeds.

Specifically, first, the number L(n), shown in FIG. 21, of pulses 1 that are generated after the count value of the pulse 2 counter A became equal to 1 until the time at which the film is expected to reach the target stop position is determined. The target stop position of the film does not depend on the type of the film but depends on the number of exposures that can be made on the film. Therefore, the number L(n) of pulses 1 is a constant that corresponds to the film counter. Next, the number S(n), shown in FIG. 21, of pulses that are generated during reverse energizing is determined.

When the number S(n) of pulses that are generated during reverse energizing is determined, then, from L(n) and S(n), the number M(n), shown in FIG. 21, of pulses 1 that are generated after the pulse 2 counter A was in the state indicated by (1) until reverse energizing is started. The film winding motor M1 is not free from variations in its characteristics, which may cause slight deviations in the stop position of the film F from camera to camera. For this reason, the parameters used in the above-mentioned formula include an adjustment value (stopping constant) described later that are set on completion of the manufacture of the camera or before its sale to a user.

Figure 14:
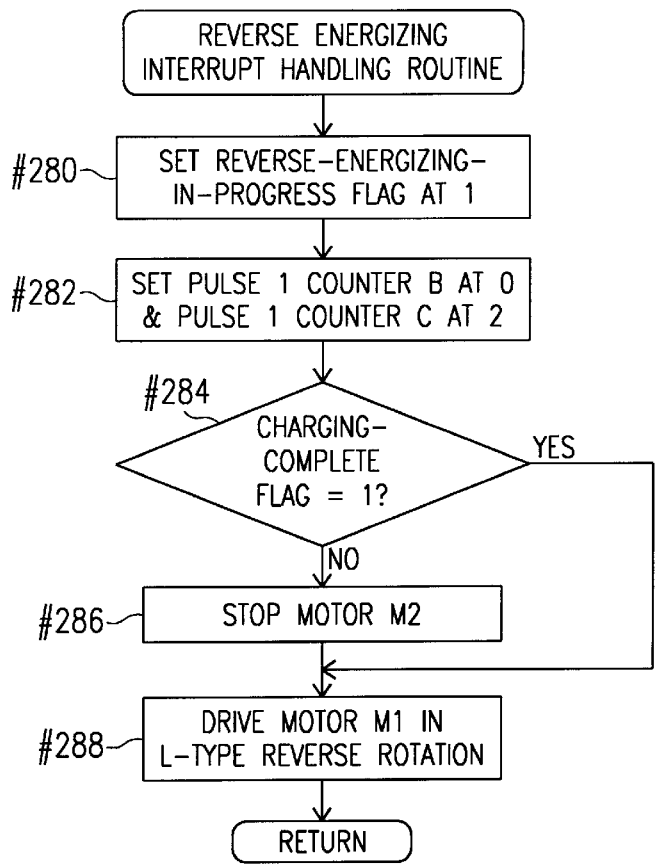
FIG. 14 is a flow chart of the reverse energizing interrupt handling routine.

After calculating the number of pulses 1 that are generated until reverse energizing is started, a setting is made such that an interrupt will be requested when the thus calculated number of pulses have been generated (step #38), with the reverse energizing interrupt handling routine shown in FIG. 14 designated as the target of the interrupt. In addition, the number of pulses 1 that are expected to be generated during reverse energizing is determined beforehand by calculation in step #36. When the predetermined number of pulses 1 are generated and an interrupt is requested, the flow jumps to the reverse energizing interrupt handling routine shown in FIG. 14.

In FIG. 14, in step #280, a reverse-energizing-in-progress flag is set at 1, and then pulse 1 counters B and C are set at 0 and 2, respectively (step #282). The pulse 1 counter B counts and stores the number of pulses 1 that are generated during reverse energizing, and the pulse 1 counter C is decremented by 1 when the number of pulses 1, i.e. the period of time, counted this time is shorter than the period of time counted last time. Next, the film winding motor M1 is energized in such a way as to be driven in L-type reverse rotation, and the flow returns to the parent routine (step #288). Steps #284 and #286 will be described later.

As a result of reverse energizing, the speed of the gear 1b of the film winding motor M1 drops abruptly. Meanwhile, when a pulse 1 is generated during reverse energizing, steps #200 to #210 of the interrupt handling routine shown in FIG. 11 are executed. Thereafter, the flow proceeds to step #212 shown in FIG. 12 to compare the period of the pulses 1 determined this time in step #200 with the period determined last time and store the value determined in step #200 in the RAM of the CPU 601. Here, if the period of time counted this time is longer, the film winding motor M1 is recognized to be gradually coming to rest (approaching the stop position). In this case, the flow proceeds to step #214, where the pulse 1 counter C is set at 2, then to step #230, where the timer TMR2 is restarted, and then returns to the parent routine.

By contrast, when the period of time as represented by the number of pulses 1 is shorter this time than last time, the pulse 1 counter C is decremented by 1 (step #216). When the count value of the pulse counter C becomes equal to 0 ("yes" in step #218), the film winding motor M1 is recognized to have come to rest once and then started to rotate its gear 1b clockwise, i.e. in the direction reverse to the direction in which it has thus far been rotating. In this case, in step #219, the film winding motor M1 is driven in L-type forward rotation for a predetermined period of time, and then, in step #220, the film winding motor M1 is stopped (see FIG. 21). Note that, for example when reverse energizing has just been started, the pulses 1 may be generated at varying intervals and this may cause the period of time counted this time to be regarded as shorter than last time. For this reason, if, in step #218, the count value of the pulse 1 counter C is not equal to 0, the flow immediately returns to the parent routine.

When the gear 1b of the film winding motor M1 rotates clockwise, the gear 20 rotates clockwise, and the planet lever 22 also rotates clockwise, thereby disengaging the planet gear 21 from the large gear portion 23a of the spool drive gear 23. At this time, the film F tends to become loose owing to its own resilience, and thus the spool 27 tends to rotate clockwise. However, since the slipping torque in the loosening direction of the spool drive gear 23 and the torsion coil spring 24 is set to be greater than that resilience, the spool 27 and the spool drive gear 23 do not rotate clockwise, and thus the film F remains held by being wound tight around the spool 27.

If the planet lever 22 continues rotating clockwise, the planet gear 21 will eventually mesh with the gear portion 30a of the cam gear 30. However, the film winding motor M1 is de-energized before that to prevent the planet gear 21 from meshing with the gear portion 30a of the cam gear 30. On the other hand, if, during reverse energizing, the film F is wound up to its tail end and is strained there, the speed drops to 0 faster than otherwise. This causes the pulse intervals to become shorter faster, and thus causes the motor to stop earlier, than expected.

Accordingly, the number of pulses 1 actually generated is compared with the number of pulses 1 determined, as expected during reverse energizing, in step #36 shown in FIG. 7 (step #224) so that, if the number of pulses 1 actually generated is smaller than the number of pulses 1 expected, the flow will proceed to step #240 to execute the film strain handling routine. When as many pulses 1 as expected are generated, initial loading is finished, and the initial-loading-in-progress flag is reset to 0 (step #40), thereby bringing the camera into a state ready for photographing.

Now, the method of calculating the adjustment value (stopping constant) used as a parameter in the formula for determining the reverse energizing start time will be described. First, the film F is transported a predetermined number of frames, and a signal requesting starting of a reverse energizing start time adjustment mode is fed to the CPU 601 from the outside through an operation member (not shown). In response to this signal, the CPU 601 starts executing the reverse energizing start time adjustment routine shown in FIG. 20.

Figure 20:
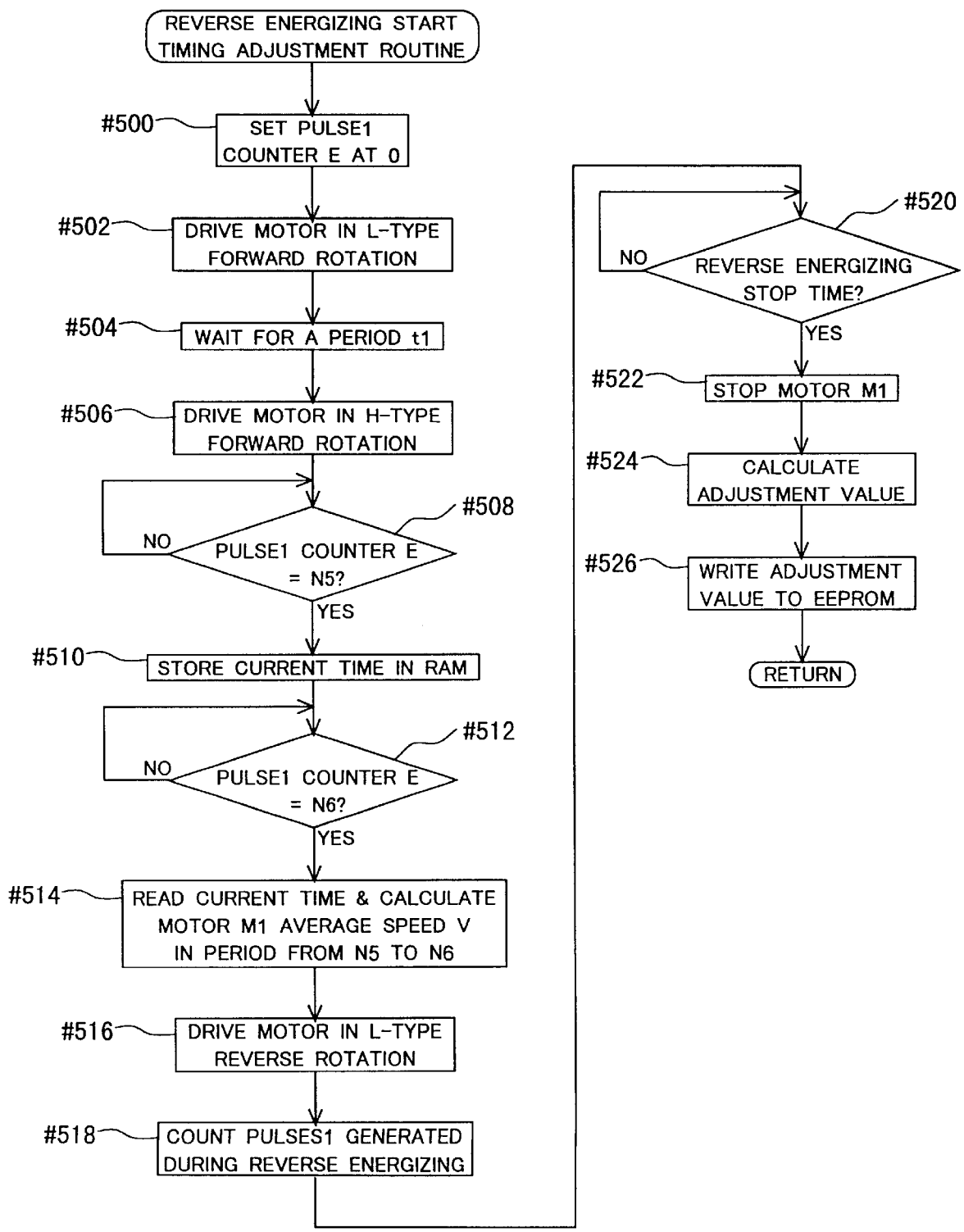
FIG. 20 is a flow chart of the reverse energizing start time adjustment routine.

In FIG. 20, first, in step #500, a pulse 1 counter E is cleared to 0. The pulse 1 counter E is a counter that is incremented by 1 every time a pulse 1 is generated. Next, in steps #502 to #506, the film winding motor M1 is driven in L-type forward rotation, and a period of time t1 thereafter, the driving of the film winding motor M1 is switched to H-type forward rotation. Next, in steps #508 to #512, the points of time at which the count value of the pulse 1 counter E becomes equal to N5 and N6, respectively, are determined, and the period of time that elapses while the pulses 1 are counted from N5 to N6 is calculated on the basis of the number of pulses 1 so as to determine the average speed v of the film winding motor M1 immediately before starting of reverse energizing (step #514). Note that the value of N6 is so set as to be approximately equal to the number of pulses 1 that are generated, in actual film winding, after the motor starts being driven until reverse energizing is started.

Next, the driving of the film winding motor M1 is switched to L-type reverse rotation (step #516). Then, while the pulses 1 that are generated during reverse energizing are counted (step #518), the reverse energizing stop time at which the period of the pulses 1 determined this time becomes shorter than last time is waited for (step #520). At the reverse energizing stop time ("yes" in step #520), the film winding motor M1 is stopped (step #522). Here, the number of pulses 1 that are generated after the starting of energizing until de-energizing represents the amount of rotation that the film winding motor M1 actually makes while its speed changes from v to 0. Accordingly, the adjustment value is calculated from this number of pulses 1 and the speed v (step #524), and the adjustment value thus calculated is written to the EEPROM (step #526). This is the end of the reverse energizing start time adjustment routine.

The use of the adjustment value (stopping constant) thus obtained permits the formula for determining the time at which to apply braking by reverse energizing to reflect reality more accurately. This helps cancel variations in the characteristics of the motor, and thereby makes it possible to stop the film F more accurately in a desired position. In this adjustment mode, operations are performed after transporting the film F a predetermined number of frames in order to simulate reality more accurately. Instead of this method, which requires a considerably long time by involving steps such as loading the film F and transporting it a predetermined number of frames, it is also possible to perform adjustment beforehand without loading the film and compensate for the difference from the case where the film is loaded afterwards when the adjustment value is calculated next time.

Figure 8:
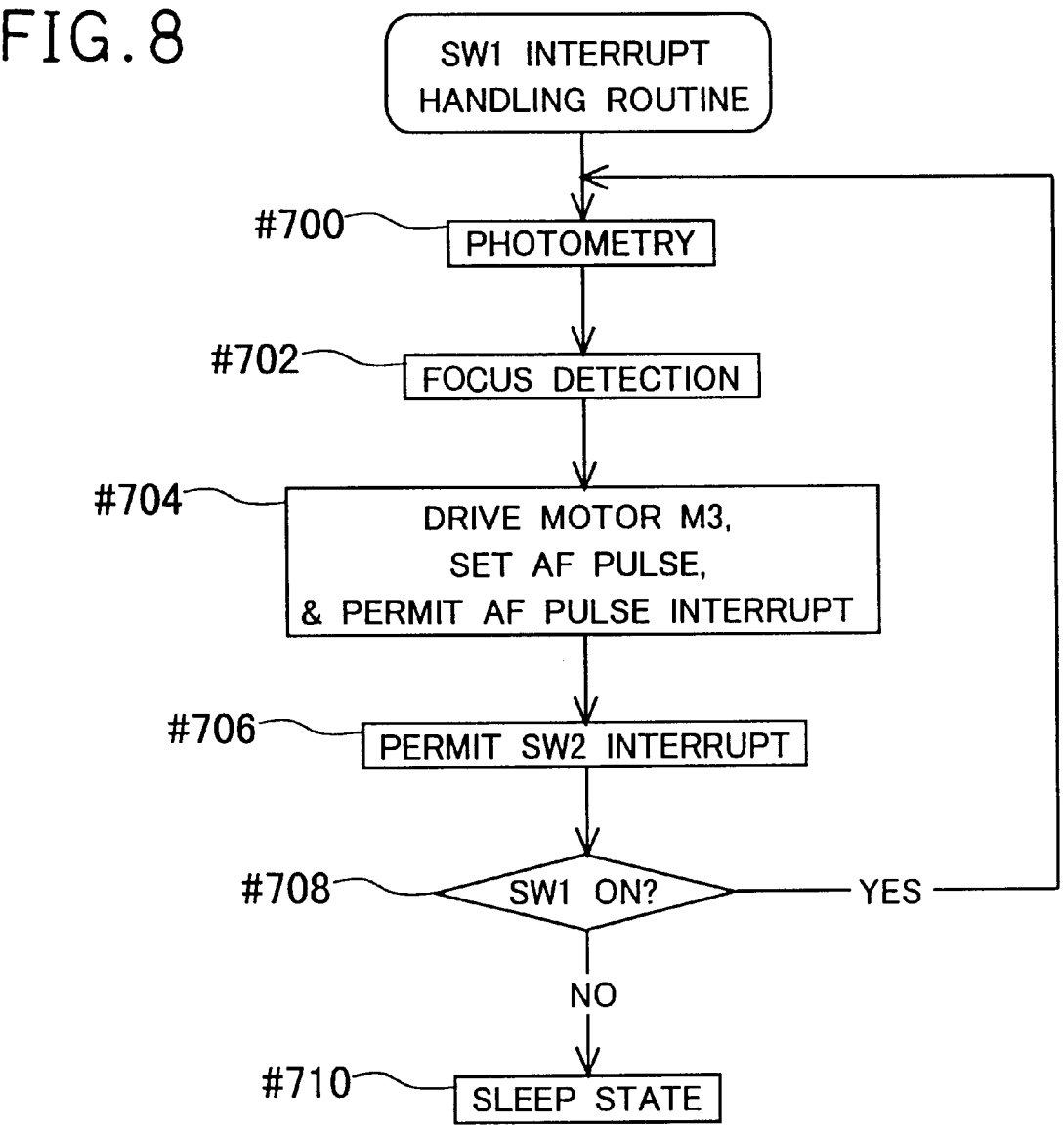
FIG. 8 is a flow chart of the SW1 interrupt handling routine.

Next, how photographing proceeds will be described. When a release button (not shown) is pressed halfway in, and thereby the switch SWi is turned on, the switch SW1 interrupt handling routine shown in FIG. 8 is executed. In step #700, the CPU 1 starts serial communication with the photometer 606 to perform photometry, and then, in step #702, the CPU 1 starts serial communication with the focus detection module 603 and various controllers to perform focus detection.

In step #704, an AF pulse is set for a target value based on the result of focus detection, and the lens drive motor M3 starts being driven. Then, an AF pulse interrupt is permitted. In step #706, an interrupt of the switch SW2, which is turned on when the release button is pressed fully in, is permitted. Then, in step #708, steps #700 to #706 are performed repeatedly as long as the switch SW1 remains on. When the switch SW1 is turned off, i.e. when the release button is released, the camera is brought into a sleep state (step #710).

Figure 9:
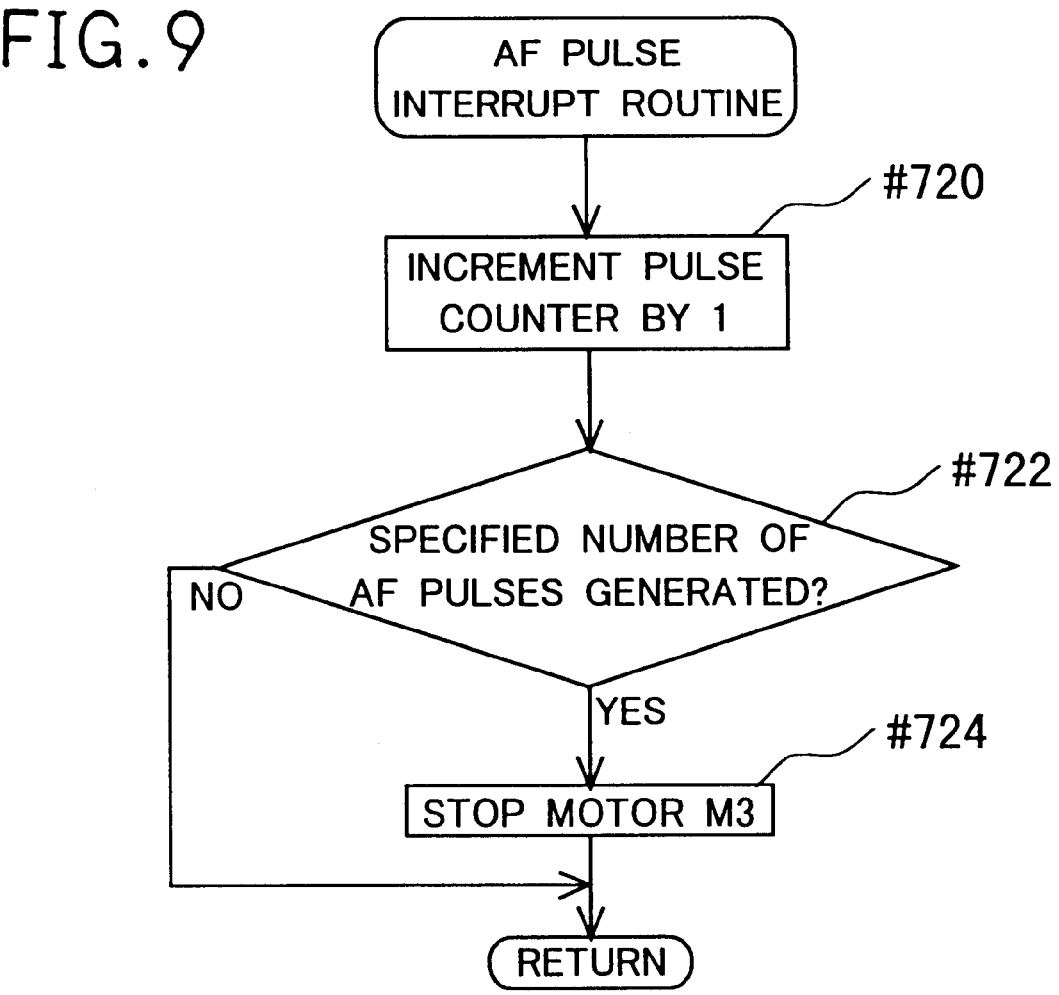
FIG. 9 is a flow chart of the AF pulse interrupt handling routine.

As the lens drive motor M3 moves, the AF pulse interrupt handling routine shown in FIG. 9 is executed, and, every time an interrupt is requested, an AF pulse counter is incremented by 1 in step #740. In steps #742 and #744, the lens drive motor M3 is driven until the count value of the AF pulse counter reaches the target value set, when the lens drive motor M3 is stopped to finish lens movement.

Figure 22:
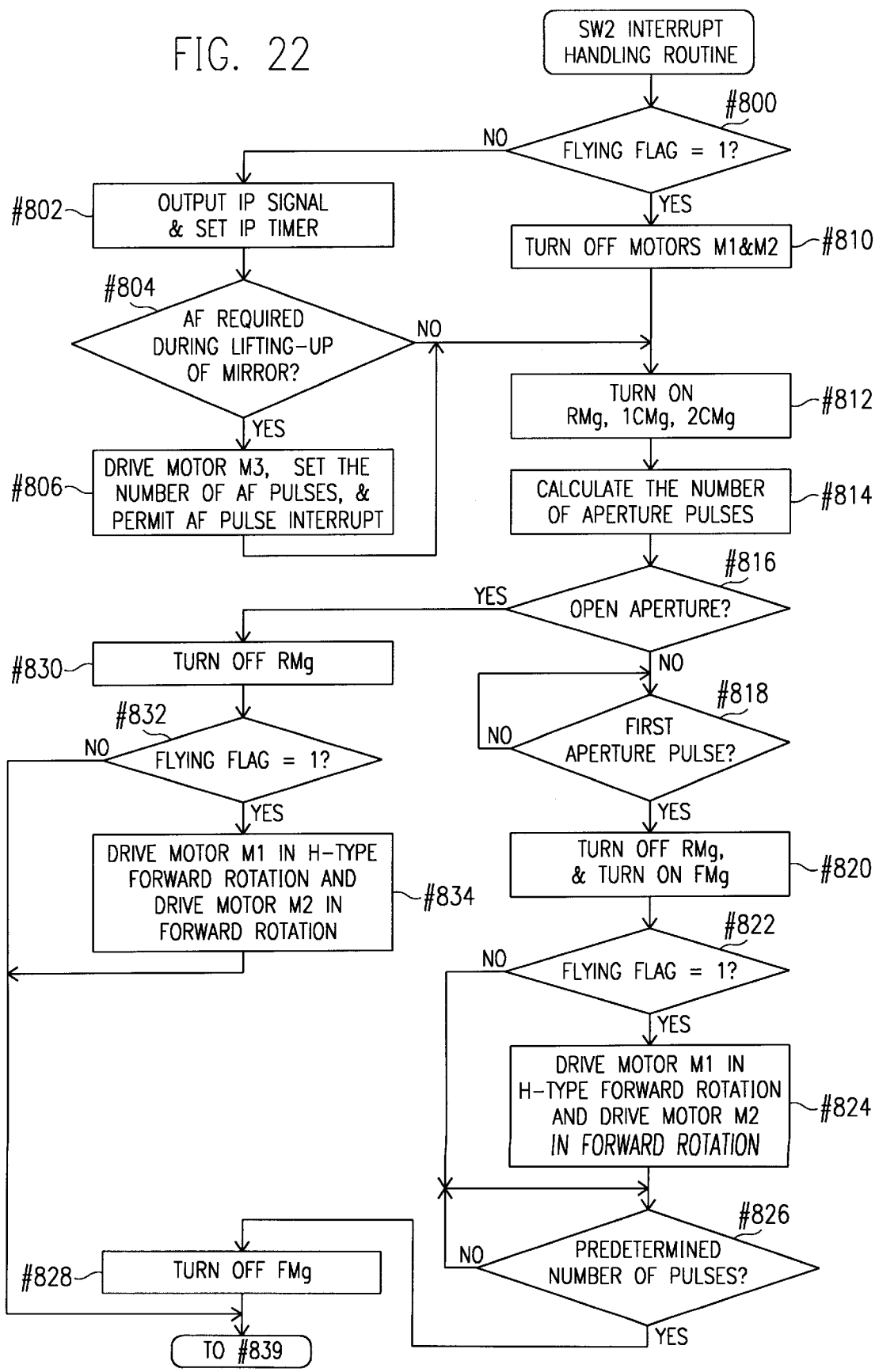
FIG. 22 is a flow chart of the SW2 interrupt handling routine.
Figure 24:
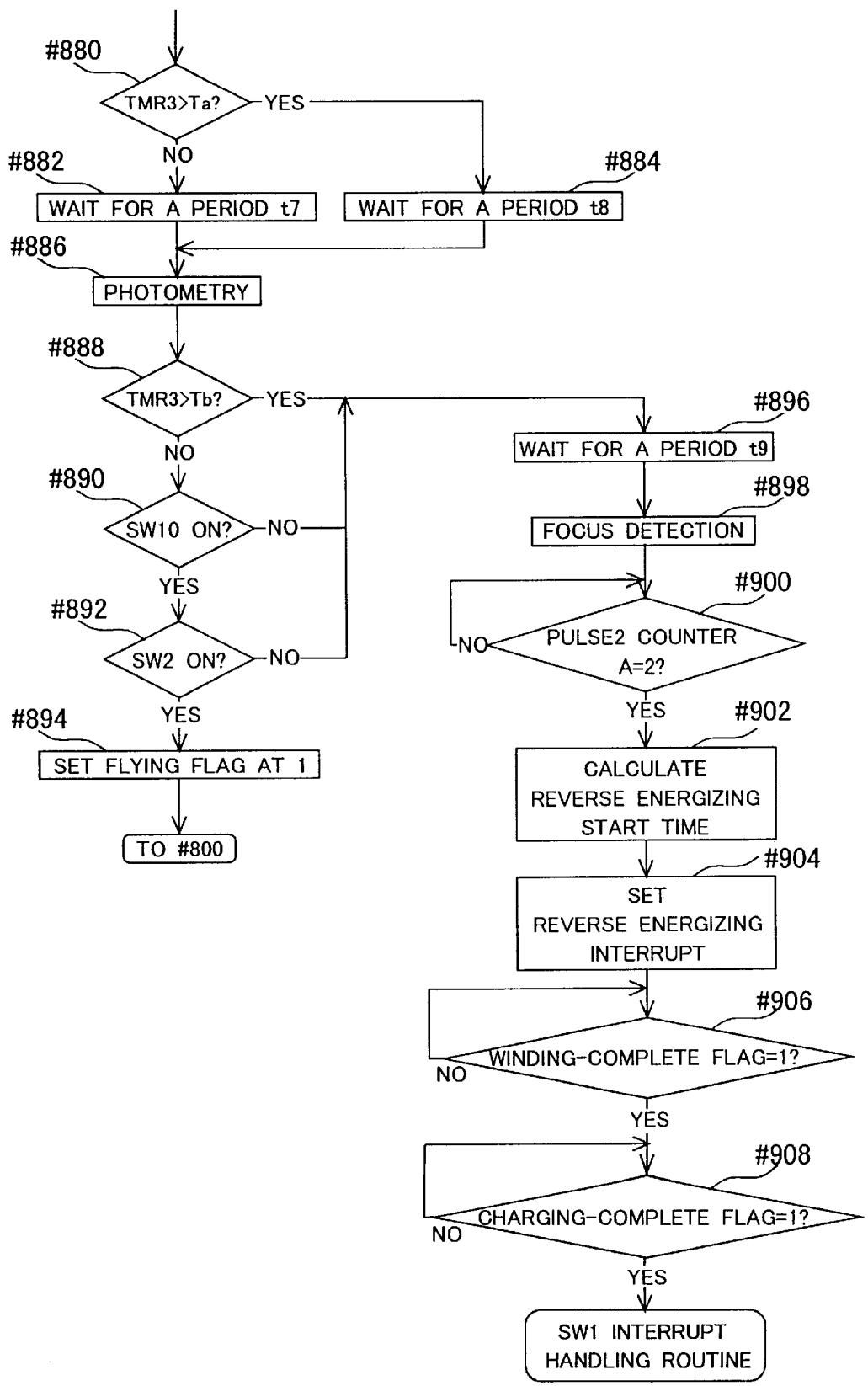
FIG. 24 is a flow chart of the SW2 interrupt handling routine.

When the release button is pressed fully in, the switch SW2 is turned on while the switch SW1 remains on, and the flow jumps to the SW2 interrupt handling routine shown in FIGS. 22 to 24 to perform releasing operations. In FIG. 22, first, in step #800, whether a flag is 1 or not is checked. This flag is set at 1 when a mode for high-speed continuous photographing is established (step #894 described later). Hereafter, this mode will be referred to as the "flying release mode", and this flag will be referred to as the "flying flag".

Figure 25:
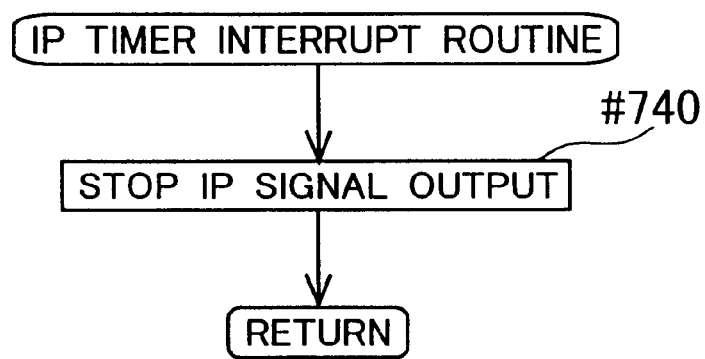
FIG. 25 is a flow chart of the IP timer interrupt handling routine.

If the flying flag is 0, then, in step #802, an IP (imprint) signal that requests imprinting of photographing data such as a date on the film F is output, and then the duration of imprinting is set in an IP timer. When a predetermined period of time set in the IP timer elapses, the IP timer interrupt handling routine shown in FIG. 25 is executed, and then, in step #740, the IP signal ceases to be output.

Back in FIG. 22, in step #804, whether to perform automatic focusing even when the mirror is lifted up so as to be retracted from the optical path as in cases where, for example, the object is moving is determined. If automatic focusing is to be performed, then, in step #806, an AF pulse is set at a target value based on the result of focus detection, and then the lens drive motor M3 starts being driven. Then, an AF pulse interrupt is allowed, and the AF pulse interrupt handling routine shown in FIG. 9 is executed in the same manner as described above to perform AF operations.

When the flying flag is 1, to permit high-speed continuous photographing, exposure preparation operations are performed without outputting the IP signal or performing AF operations during the lifting-up of the mirror. First, in step #810, the film winding motor M1 and the charge motor M2 are turned off. Here, if the flying flag is 0, film feeding and charging are complete, and therefore the motors M1 and M2 are both off. In step #812, the releasing magnet RMg and the first and second shutter blade holding magnets 1CMg and 2CMg are energized. When the releasing magnet RMg is energized, the charge lever 117 shown in FIG. 5 moves in the direction indicated by (A).

Then, the aperture diaphragm and the mirror are unlocked so that the aperture diaphragm is capable of being stopped down and the mirror is capable of being lifted up so as to be retracted from the optical path. On the other hand, the first and second blades of the shutter, which are unlocked by energizing the releasing magnet RMg, are then held by energizing the first and second shutter blade holding magnets 1CMg and 2CMg. The purpose of turning off the motors M1 and M2 is to secure a sufficient supplied voltage for the releasing magnet RMg and the first and second shutter blade holding magnets 1CMg and 2CMg, which require large amounts of current to operate. The duration for which these magnets are energized is about 5 milliseconds, and therefore, even though the motors M1 and M2 are stopped momentarily, it is possible to perform continuous photographing at satisfactorily high speed.

Next, the number of aperture pulses corresponding to a predetermined aperture value is calculated (step #814), and then whether the predetermined aperture value is the open aperture value or not is checked (step #816). If so, the releasing magnet RMg is turned off to lock the aperture diaphragm (step #830), and then, if the flying flag is 1, the driving of the motors M1 and M2 is restarted (steps #832, #834). Since the duration for which the film winding motor M1 is stopped momentarily is about 5 milliseconds as described above, the driving of the film winding motor M1 is restarted in H-type high-speed rotation.

If, in step #816, the predetermined aperture value is not the open aperture value, the aperture diaphragm, which has been unlocked by the releasing magnet RMg, starts aperture adjusting motion, while detection of a first aperture pulse is waited for (step #818). When a first aperture pulse is detected and thereby starting of aperture adjusting motion is recognized, then, in step #820, the releasing magnet RMg is turned off and simultaneously the aperture diaphragm locking magnet FMg, which requires a smaller amount of current than the releasing magnet RMg, is energized to keep the aperture diaphragm in an unlocked state.

When the flying flag is 1, the driving of the film winding motor M1 is restarted in H-type rotation, and the driving of the charge motor M2 is also restarted (steps #822, #824). Thereafter, in step #826, pulses are counted until the number of counted pulses coincides with the number of aperture pulses calculated in step #814. When the calculated number of pulses have been generated, then, in step #828, the aperture diaphragm locking magnet FMg is turned off to stop the motion of the aperture diaphragm.

If, in step #839 shown in FIG. 23, the flying flag is 1, the film winding motor M1 is driven to transport the film F until the count value of the pulse 2 counter A becomes equal to 2 (step #840). When the count value of the pulse 2 counter A becomes equal to 2, the operations for stopping the film winding motor M1 start being performed in the same manner as in initial loading. In step #842, on the basis of the values previously obtained and stored in the RAM, i.e. the number of pulses 1 generated in a period in which no pulse 2 is generated and the time interval of pulses 2, the number of pulses 1 that are generated after the count value of the pulse 2 counter A became equal to 2 until braking is applied by reverse energizing is determined by substituting appropriate values in a formula prepared in advance.

After calculating the number of pulses 1 that are generated until reverse energizing is started, a setting is made such that an interrupt will be requested when the thus calculated number of pulses have been generated (step #844), with the reverse energizing interrupt handling routine shown in FIG. 14 designated as the target of the interrupt. When the predetermined number of pulses 1 are generated and an interrupt is requested, the flow jumps to the reverse energizing interrupt handling routine shown in FIG. 14.

In step #846, whether, as a result of execution of the pulse 1 counter interrupt handling routine (see FIGS. 11 and 2), winding is complete and thus a winding-complete flag is 1 or not is checked. When the lever 115 (see FIG. 5) moves back to its original position and charging is complete, the switch SW4 is turned on, and the switch SW4 interrupt handling routine (see FIG. 15) is executed, thereby setting a charging-complete flag at 1. In step #848, whether the charging-complete flag is 1 or not is checked. The checks in steps #846 and #848 are performed to prevent starting of exposure when winding is stopped as a result of the film being strained at its tail end or when charging of the shutter is stopped half-finished.

In step #850, the flow waits for a predetermined period of time to elapse that is long enough to allow confirmation of completion of photometry with the aperture diaphragm fully stopped down by the releasing magnet RMg energized and with the mirror free of bounding movement (vibration) after detection of completion of its charging. This helps prevent erroneous execution of the exposure operations described below.

After the lapse of the predetermined period of time, in step #852, the first shutter blade holding magnet 1CMg is de-energized, and thus the first blade of the shutter is opened to start exposure. After waiting for a period of time to elapse that corresponds to the shutter speed Tv (step #854), in step #856, the second shutter blade holding magnet 2CMg is de-energized, and thus the second blade of the shutter is closed to end exposure. After waiting for a predetermined period of time t3 to elapse that is required for the second blade of the shutter to complete its movement (step #858), the flow proceeds to film winding operations for transporting the film one frame and charging the shutter and other components in preparation for the next shot In step #860, to transport the film F and charge the shutter and other components, the film winding motor M1 is driven in L-type forward rotation and simultaneously the charge motor M2 is driven in forward rotation. Film winding is performed in the same manner as in initial loading. Specifically, as the gear 1b rotates counter-clockwise, the film F is wound around the spool 27, and meanwhile the photointerruptor 6 and the switch SW3 generate pulses 1 and pulses 2, respectively. In step #862, the timers TMR1 to TMR3 are restarted, and then, in steps #864 to 868, various interrupts are permitted in the same manner as described previously.

On completion of charging, the switch SW4 is turned on. Therefore, an interrupt of this switch SW4 is additionally permitted in step #870. Then, in step #872, the charging-complete flag, the winding-complete flag, and the flying flag are reset to 0, and then, in step #874, the flow waits for the switch SW9, which is turned on when charging of the mirror is complete, to be turned on. When the switch SW9 is turned on, then, in step #876, the timer TMR3 is stopped, and the period of time required to charge the mirror is read out.

In step #880, the period of time read out from the timer TMR3 is compared with a predetermined period of time Ta. If the former is equal to or shorter than the latter, the flow waits for a period of time t7 to elapse (step #882); if the former is longer than the latter, the flow waits for a period of time t8 to elapse (step #884). This wait is secured to wait for the bounding movement (vibration) of the mirror, as occurs when its charging is complete, to die away until the mirror becomes stable. When charging of the mirror takes a short time, i.e. when the mirror is moved at high speed, a large amount of bounding occurs, and therefore a wait of a long period of time t7 is secured; when charging of the mirror takes a long time, i.e. when the mirror is moved at slow speed, a small amount of bounding occurs, and therefore a wait of a short period of time t8 is secured.

Next, in step #886, photometry is performed in preparation for continuous photographing, and then, in step #888, the period of time read out from the timer TMR3 is compared with a predetermined period of time Tb. If the period of time read out from the timer TMR3 is equal to or shorter than the predetermined period of time Tb, and in addition the switch SW10 for switching to continuous photographing is on (step #890), and in addition the switch SW2 is on (step #892), then, in step #894, the flying flag is set at 1 and the SW2 interrupt handling routine is repeated.

If the period of time read out from the timer TMR3 is longer than the predetermined period of time Tb, or the switch SW10 is off, or the switch SW2 is off (steps #888 to #892), then a photographing mode (for single-shot photographing or low-speed continuous photographing) is established that consists of steps starting with step #896.

When the supplied voltage is low, it is difficult to operate the camera in the flying release mode, which requires simultaneous activation of various actuators to achieve high-speed operation. Therefore, when the time required to charge the mirror is longer than the predetermined period of time Tb, the supplied power is recognized to be low, and the flying release mode is not established. In this case, charging and film feeding require an accordingly long time, and therefore, even if the flying release mode is established, it is impossible to perform high-speed continuous photographing, and thus it is quite reasonable to perform low-speed continuous photographing instead.

In single-shot photographing and low-speed continuous photographing, focus detection is performed. Focus detection is achieved by the use of the light reflected from a sub-mirror coupled to the mirror, and therefore, first, in step #896, the flow waits for a period of time t9 to elapse to allow the bounding movement of the sub-mirror to die away, and then, in step #898, focus detection is performed. Then, in steps #900 to #908, as in steps #840 to #848, the film winding motor M1 is stopped, and, after confirming that the winding-complete flag and the charging-complete flag are 1, the switch SW1 interrupt handling routine is repeated.

In this way, in the switch SW2 interrupt handling routine, if the supplied voltage is sufficient, continuous photographing is performed in the flying release mode (with the flying flag set at 1), and thus exposure preparation operations are started after completion of charging of the mirror and the aperture diaphragm (with the switch SW9 turned on) and before completion of charging of the shutter and transporting of the film. This makes high-speed continuous photographing possible.

However, if the film F is broken for some reason, or if the film F wound tight around the spool 27 becomes so loose as to make winding of the film impossible, whereas the photointerruptor 6 outputs pulses 1, the switch SW3 outputs no pulse 2. Therefore, as in initial loading, in step #208 of the pulse 1 interrupt handling routine (FIG. 11), whether the count value of the pulse 1 counter A is equal to or greater than N2 or not is checked. If the count value of the pulse 1 counter A is equal to or greater than N2, then the flow proceeds to step #234 and, since initial loading is not in progress, further to step #236 to execute the error detection routine (not shown). In the error detection routine, the motors M1 and M2 are stopped, and then a buzzer or the display warns the user of an error.

Figure 5:
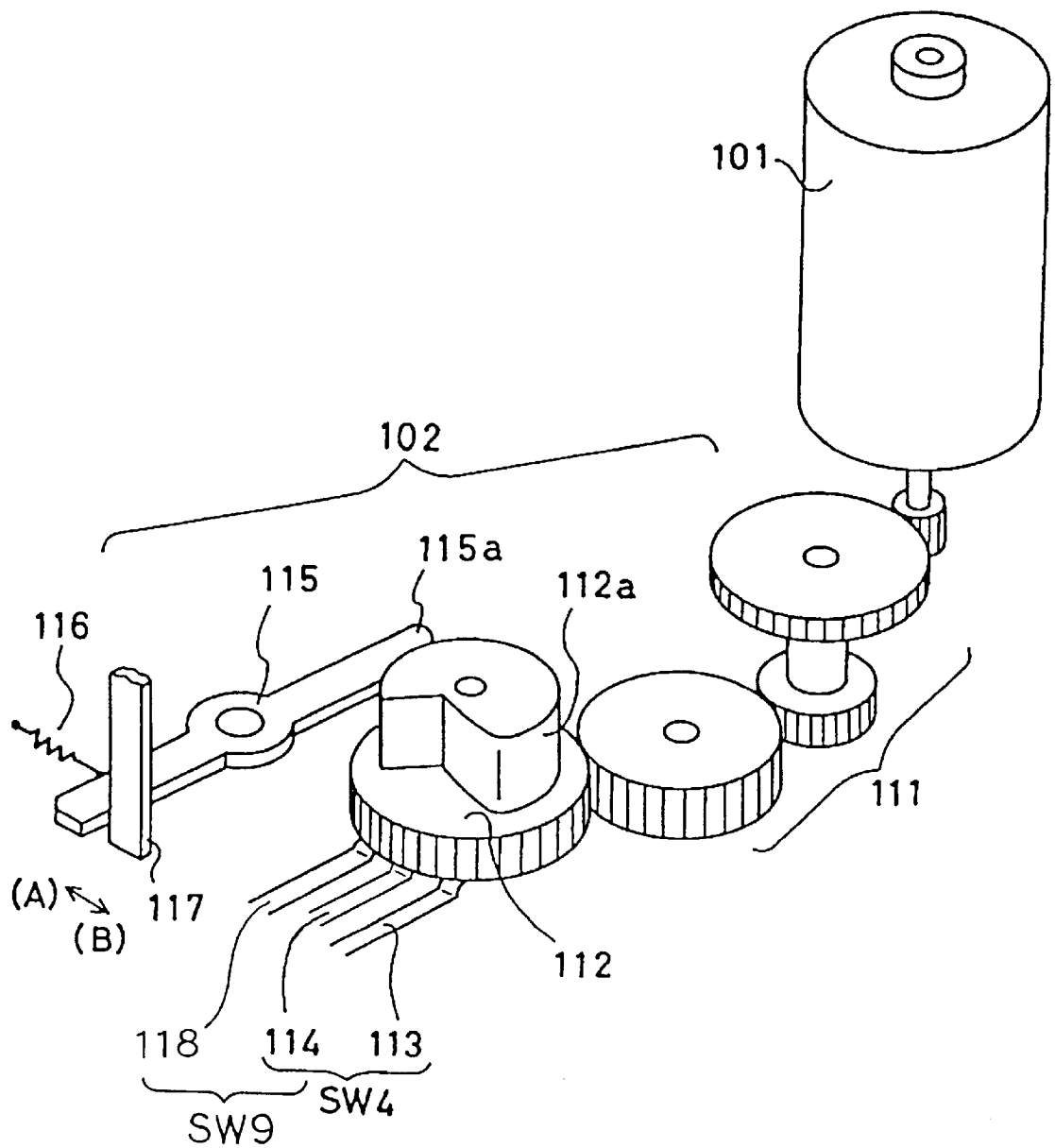
FIG. 5 is a perspective view illustrating the action of the charge mechanism of the camera of the embodiment.

On the other hand, when the charge motor M2 is energized and thereby, through the reduction gear 111, the charge cam 112 rotates clockwise in FIG. 5, the cam 112a of the charge cam 112 rotates the lever 115 counter-clockwise against the force with which it is loaded by the spring 116 so as to press the charge lever 117 in the direction (B) and thereby charge the aperture diaphragm, the mirror, and the shutter. When the charge cam 112 starts rotating, the switch SW4 immediately turns from on to off. When the charge cam 112 makes substantially one turn, the charge lever 117 is locked to complete charging of the aperture diaphragm, the mirror, and the shutter. Subsequently, when the lever 115 is rotated clockwise by the spring 116 until it falls into that portion of the cam 112a where its radius is smallest, the switch SW4 is turned on again.

Figure 15:
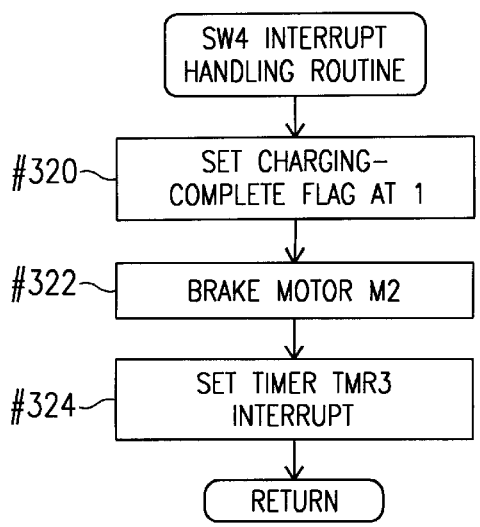
FIG. 15 is a flow chart of the SW4 interrupt handling routine.

When the switch SW4 is turned from off to on as described above, an interrupt is requested, and the flow jumps to the switch SW4 interrupt handling routine shown in FIG. 15. In the switch SW4 interrupt handling routine shown in FIG. 15, first, the charging-complete flag is set at 1 (step #320), and then braking is applied to the charge motor M2 (step #322). A period of time t4 thereafter, an interrupt is requested, and the timer TMR3 for stopping the charge motor M2 is set (step #324).

When the film winding motor M1 is driven by reverse energizing before completion of charging of the aperture diaphragm, the mirror, and the shutter, the voltage fed to the motors drops so greatly that it is impossible to drive the charge motor M2. To prevent this, in step #284 shown in FIG. 14, the charging-complete flag is checked. If the charging-complete flag is 0, it is recognized that charging is not complete yet, and the charge motor M2 is stopped (step #286). After completion of reverse energizing, in step #225 shown in FIG. 12, the winding-complete flag is set at 1, and then, in step #226, the charging-complete flag is checked again. If the charging-complete flag is 0, charging is not complete yet, and thus the charge motor M2 is driven again to charge the aperture diaphragm, the mirror, and the shutter (step #228).

If the film F is strained at its tail end, in the same manner as when film strain occurs in initial loading, slipping occurs between the reduction gear 2 and the torsion coil spring 3. As a result, the photointerruptor 6 ceases to output pulses 1, and thus the flow jumps to the timer TMR2 interrupt handling routine shown in FIG. 16. Here, the film winding motor M1 is first driven in L-type rotation, and, a predetermined period of time thereafter, the flow proceeds to step #358 to execute a film strain handling routine. In this embodiment, the film strain handling routine is the same as the rewinding routine shown in FIG. 10.

Next, the rewinding routine will be described. When the film F is found strained in one of the operation routines, or when a switch (not shown) that is pressed when the user wishes to rewind the film F half-used is found pressed, the flow jumps to the rewinding routine shown in FIG. 10.

First, in step #150, the rewinding-in-progress flag is set at 1, and then a pulse 1 interrupt 2 and a timer TMR2 interrupt 2 are permitted (steps #152 to #154), with the pulse 1 interrupt handling routine 2 and the timer TMR2 interrupt handling routine 2 designated as their respective target interrupts. Permitting these interrupts makes it possible to detect failure to drive the film winding motor M1 owing to some error arising when the cam gear 30 is rotated as will be described later.

Figure 18:
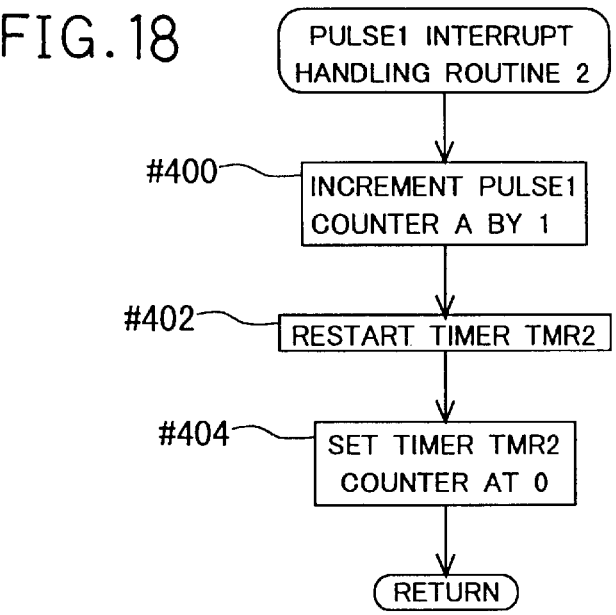
FIG. 18 is a flow chart of the pulse 1 interrupt handling routine 2.
Figure 19:
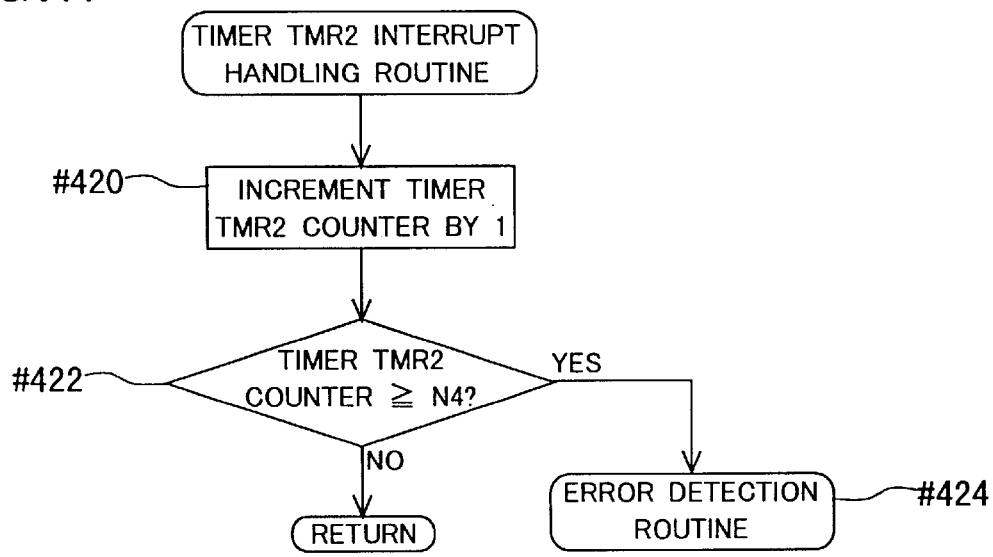
FIG. 19 is a flow chart of the timer TMR2 interrupt handling routine 2.

In the pulse 1 interrupt handling routine 2 shown in FIG. 18, while the pulse 1 counter A is counting pulses 1 that are generated while a pulse 2 is being generated, the timer TMR2 is restarted (steps #400 to #404). If no pulse 1 is generated before a predetermined period of time elapses (before the count value of the timer TMR2 counter becomes equal to N4), the flow proceeds from step #422 shown in FIG. 19 to step #424 to execute the error detection routine.

Next, in step #156, the film winding motor M1 is driven in L-type reverse rotation, and the flow waits for the switch SW8 to be turned off (step #158). When the film winding motor M1 is driven in L-type reverse rotation, the gear 1b rotates clockwise, and the gear 20 rotates clockwise. As a result, the planet lever 22 rotates clockwise until eventually the planet gear 21 meshes with the gear portion 30a of the cam gear 30. When the planet lever 22 strikes a stopper (not shown) and thus stops rotating, the rotation of the gear 20 is transmitted through the planet gear 21 to the cam gear 30, causing the cam gear 30 to rotate clockwise.

Then, as shown in FIG. 4B, the projection 36b of the rewinding planet lever 36 is released from the cam portion 30b of the cam gear 30, and then the rewinding planet lever 36 is rotated clockwise by the spring 38. When the rewinding planet gear 37 meshes with the rewinding gear 39, it strikes a stopper (not shown) and thus stops. Moreover, as the rewinding planet lever 36 rotates clockwise, its bent portion 36a makes the arm 26b of the torsion coil spring 26 rotate counter-clockwise so as to remove the tightening force of the torsion coil spring 26. On the other hand, the switch SW8 is turned off when the cam portion 30b of the cam gear 30 is well away from the projection 36b of the rewinding planet lever 36. When the switch SW8 is turned off, braking is applied to the film winding motor M1 for a period of time t5 (step #160) so as to stop the rotation of the cam gear 30.

Then, the film winding motor M1 is driven in L-type forward rotation (step #162), and this makes rewinding possible. At this time, the gear 20 rotates counter-clockwise and the planet lever 22 also rotates counter-clockwise. However, in the middle of this rotation, the side portion 22a of the planet lever 22 strikes the side portion 36c of the rewinding planet lever 36 so as to prevent such rotation, and thus the planet gear 21 rotates idly without engaging with the large gear portion 23a of the spool drive gear 23 nor the gear portion 30a of the cam gear 30 (FIG. 4C).

On the other hand, through the gear 35 and the rewinding planet gear 37, the rewinding gear 39 rotates clockwise, and thereby causes, through the gear train 40, the rewinding fork gear 41 and the rewinding fork 42 to rotate clockwise so as to rewind the film F back into the film cartridge 74. At this time, the encoder gear 5 rotates to cause the photointerruptor 6 to output pulses 1. In addition, in synchronism with the film F being rewound, the sprocket 50 rotates clockwise to cause the switch SW3 to generate pulses 2.

Therefore, the pulse 1 interrupt handling routine 1, the pulse 2 interrupt handling routine 2, and the timer TMR2 interrupt handling routine 2 are set (step #164). Here, the control flow is almost the same as in initial loading, except that, as shown in FIG. 17, the pulse 2 interrupt handling routine 2 simply clears the pulse 1 counter A to 0 in step #380 to allow detection (step #236) of an error such as breakage of the film F where the photointerruptor 6 outputs pulses 1 but the switch SW3 outputs no pulse. Then, in step #166, the flow waits for a period of time ti to elapse, and then, in step #168, the film winding motor M1 is driven in H-type forward rotation.

In film rewinding, as the film F moves, the spool 27 rotates clockwise, and the spool drive gear 23 also rotates clockwise. At this time, the torsion coil spring 26 exerts no tightening force, and therefore the spring barrel 25 can rotate clockwise with almost no resistance. Accordingly, the spool 27 rotates together with the torsion coil spring 24 and the spool drive gear 23 and thus with almost no load. This helps minimize the rotation force of the rewinding fork 42.

As film rewinding proceeds, when the head end of the film F passes the film detecting pin 60, the film detecting pin 60 is pressed toward the film F side by the film detecting armature 61, and thus the switch SW6 is turned off. On detection of the switch SW6 being turned off (step #170), the flow waits for the photointerruptor 6 to generate so many pulses as corresponds to the amount of rotation of the rewinding fork 42 that is equivalent to the length of the remaining leader portion of the film F so as to ensure that the film F will be rewound completely into the film cartridge 74 (step #172). When the predetermined number of pulses are generated, then, in step #174, braking is applied to the film winding motor M1 for a period of time t5 to stop it (step #176), and then a pulse 2 interrupt is inhibited (step #178).

Now, film winding is complete. To restore the cam gear 30 back to its position for winding, in step #180, the film winding motor M1 is driven in L-type reverse rotation. As a result, the cam gear 30 rotates clockwise, and thus the cam portion 30c of the cam gear 30 strikes the projection 36b of the rewinding planet lever 36 and thereby causes the rewinding planet lever 36 to rotate counter-clockwise against the force with which it is loaded by the spring 38.

When the projection 36b of the rewinding planet lever 36 runs onto the cam portion 30b of the cam gear 30, the position for winding is restored. At this time, the switch SW8 is turned on, and, on detecting this in step #182, braking is applied to the film winding motor M1 for a period of time t6 to stop it (steps #184 and #186). This is the end of all operations related to film rewinding, and a message indicating completion of film winding is displayed on the display of the camera. This indication allows the user to open the back lid (not shown) to take out the film cartridge 74 containing the exposed film.

TABLE 1

| Q1  | Q2  | Q3  | Q4  | Q5  | Q6  | State of film winding motor M1 |
|-----|-----|-----|-----|-----|-----|-------------------------------|
| off | off | off | off | off | off | Resting                       |
| on  | off | off | on  | off | off | L-type Forward Rotation       |
| off | on  | off | on  | off | off | H-type Forward Rotation       |
| off | off | on  | off | off | on  | L-type Reverse Rotation       |
| off | off | on  | off | on  | off | H-type Reverse Rotation       |
| off | off | off | on  | off | on  | L-type Braking                |
| off | off | off | on  | on  | off | H-type Braking                |

TABLE 2

| CMD0 | CMD1 | CMD2 | P1 | P2 | P3 | P4 | P5 | P6 | State of film winding motor M1 |
|------|------|------|----|----|----|----|----|----|-------------------------------|
| H    | H    | H    | H  | H  | H  | L  | L  | L  | Resting                       |
| H    | L    | L    | L  | H  | H  | H  | L  | L  | L-type Forward Rotation       |
| H    | L    | H    | H  | L  | H  | H  | L  | L  | H-type Forward Rotation       |
| L    | H    | L    | H  | H  | L  | L  | L  | H  | L-type Reverse Rotation       |
| L    | H    | H    | H  | H  | L  | L  | H  | L  | H-type Reverse Rotation       |
| L    | L    | L    | H  | H  | H  | H  | L  | H  | L-type Braking                |
| L    | L    | H    | H  | H  | H  | H  | H  | L  | H-type Braking                |

TABLE 3

| CMD3 | CMD4 | Q7  | Q8  | State of charge motor M2 |
|------|------|-----|-----|--------------------------|
| H    | H    | off | off | Resting                  |
| L    | H    | on  | off | Forward Rotation         |
| H    | L    | off | on  | Braking                  |

What is claimed is:

1. A camera comprising:
   a first charge mechanism for charging a mirror;
   a second charge mechanism for charging an aperture diaphragm;

a third charge mechanism for charging a shutter;

an exposure preparation mechanism for performing an exposure preparation operation in response to a releasing operation;

a selector for distinguishing between single-shot photographing and continuous photographing;

a first detector for detecting completion of charging of the mirror;

a second detector for detecting completion of charging of the aperture diaphragm;

a third detector for detecting completion of charging of the shutter; and a controller for executing a flow of control such that, when the selector detects continuous photographing being performed and in addition the first and second detectors detect completion of charging of the mirror and the aperture diaphragm, the exposure preparation operation is started irrespective of a result of detection by the third detector.

2. A camera as claimed in claim 1, further comprising:

a film feeder for feeding a film by one frame; and a film feeding completion detector for detecting completion of one-frame feeding of the film, wherein the controller starts the exposure preparation operation irrespective of a result of detection by the film feeding completion detector.

3. A camera as claimed in claim 1, wherein the exposure preparation mechanism is a mechanism for lifting up the mirror and for stopping down the aperture diaphragm.

4. A camera as claimed in claim 1, wherein the controller starts the exposure preparation operation a first predetermined period of time after completion of charging of the mirror or the aperture diaphragm.

5. A camera as claimed in claim 4, wherein the controller varies the first predetermined period of time in accordance with a period of time from starting to completion of charging of the mirror.

6. A camera as claimed in claim 1, wherein the controller changes e flow of control in accordance with a period of time from starting to completion of charging of the mirror.

7. A camera as claimed in claim 6, wherein the controller stops executing the flow of control when the period of time from starting to completion of charging of the mirror is longer than a second predetermined period of time.

8. A camera as claimed in claim 1, further comprising:

a focusing mechanism for driving a taking lens so as to focus it on an object to be shot, wherein the controller inhibits operation of the focusing mechanism while executing the flow of control.

9. A camera as claimed in claim 1, further comprising:

an imprinter for imprinting photographing data on a film, wherein the controller inhibits operation of the imprinter while executing the flow of control.

10. A camera as claimed in claim 2, wherein the controller starts an exposure operation when, after starting of the exposure preparation operation, the third detector detects completion of charging of the shutter and in addition the film feeding completion detector detects completion of feeding of the film.

11. A camera as claimed in claim 10, wherein the controller starts the exposure operation a third predetermined period of time after starting of the exposure preparation operation.

12. A camera as claimed in claim 2, wherein the exposure preparation mechanism has a magnet for unlocking at least one of the mirror, the aperture diaphragm, and the shutter, and the controller de-energizes a motor for driving the camera when the magnet is activated.

13. A camera as claimed in claim 12, wherein the motor for driving the camera is at least one of a motor for feeding the film or a motor for charging.

* * * * *